United States Patent
Plattner et al.

(10) Patent No.: US 9,740,741 B2
(45) Date of Patent: Aug. 22, 2017

(54) AGGREGATE QUERY-CACHING IN DATABASES ARCHITECTURES WITH A DIFFERENTIAL BUFFER AND A MAIN STORE

(71) Applicant: Hasso-Plattner-Institut für Softwaresystemtechnik GmbH, Potsdam (DE)

(72) Inventors: Hasso Plattner, Schriesheim (DE); Stephan Mueller, Potsdam (DE); Jens Krueger, Oranienburg (DE); Juergen Mueller, Berlin (DE); Christian Schwarz, Potsdam (DE)

(73) Assignee: Hasso-Plattner-Institut Fur Softwaresystemtechnik GmbH, Potsdam (DE)

( * ) Notice: Subject to any disclaimer, the term of this patent is extended or adjusted under 35 U.S.C. 154(b) by 238 days.

(21) Appl. No.: 14/176,711

(22) Filed: Feb. 10, 2014

(65) Prior Publication Data
US 2014/0310232 A1   Oct. 16, 2014

Related U.S. Application Data

(60) Provisional application No. 61/810,730, filed on Apr. 11, 2013.

(51) Int. Cl.
G06F 17/30  (2006.01)

(52) U.S. Cl.
CPC .... *G06F 17/3048* (2013.01); *G06F 17/30457* (2013.01)

(58) Field of Classification Search
CPC .............................................. G06F 17/30457
(Continued)

(56) References Cited

U.S. PATENT DOCUMENTS

2002/0107876 A1*  8/2002  Tsuchida ........... G06F 17/30575
2004/0254947 A1* 12/2004  Dombroski ......... G06F 17/3048
(Continued)

OTHER PUBLICATIONS

K.S. Candan, et al.; "View Invalidation for Dynamic Content Caching in Multitiered Architectures"; Proceedings of the 28th VLDB Conference; NEC USA, Inc.; 2002; 12 pages.
(Continued)

*Primary Examiner* — Mahesh Dwivedi
*Assistant Examiner* — Johnese Johnson
(74) *Attorney, Agent, or Firm* — Fountainhead Law Group P.C.

(57) ABSTRACT

The invention relates to a computer system for both online transaction processing and online analytical processing, comprising: a processor coupled to a database, the database comprising the database comprising: a main store (116) for storing records, a differential buffer (114) for receiving and buffering added or deleted or modified records, the differential buffer being coupled to the main store, a schema comprising records stored in the main store and records stored in the differential buffer, and a cache store (112) for caching a result of a query against the schema; and a cache controller (106) executable by the processor and communicatively coupled to the database, the cache controller being configured for: storing the result of the query in the cache store; receiving an analytical request; and determining, in response to the received request, an up-to-date result of the query by (216): accessing the cache store to obtain the cached result; determining the records of the schema that have been added or deleted or modified since the step of storing the cached result in the cache store on the basis of the records stored in the differential buffer; and incrementally deriving the up-to-date result from the cached result and from the records determined in the previous step.

13 Claims, 25 Drawing Sheets

(58) Field of Classification Search
USPC .......................................................... 707/602
See application file for complete search history.

(56) References Cited

U.S. PATENT DOCUMENTS

2009/0172014 A1* 7/2009 Huetter ............. G06F 17/30551
2010/0235335 A1* 9/2010 Heman ............. G06F 17/30345
707/703

OTHER PUBLICATIONS

I.S. Mumick, et al.; "Maintenance of Data Cubes and Summary Tables in a Warehouse"; Jun. 1, 1997; 12 pages.
Hasso Plattner, et al.; "In Memory Data Management"; 2011; 43 pages.
Plattner et al.: "In-Memory Data Management Technology and Applications"; Second Edition; ISBN 978-3-642-29574-4; ISBN 978-3-642-29575-1 (eBook); Springer-Verlag Berlin Heidelberg 2011, 2012; 35 pages.

* cited by examiner

TABLE I
INITIAL SNAPSHOT OF BASE TABLE AND VIEW (a) Base table

| Facts | | | | | | | |
|---|---|---|---|---|---|---|---|
| Main | | | | Delta | | | |
| ID | Date | Prod | Amt | ID | Date | Prod | Amt |
| 1 | 1/1/2013 | 1 | 100 | | | | |
| 2 | 1/1/2013 | 1 | -50 | | | | |
| 3 | 1/1/2013 | 2 | 30 | | | | |
| 4 | 1/1/2013 | 2 | 60 | | | | |
| 5 | 1/2/2013 | 1 | -10 | | | | |

(b) Materialized aggregate table

| Aggregates | | |
|---|---|---|
| Date | Prod | SUM(Amt) |
| 1/1/2013 | 1 | 50 |
| 1/2/2013 | 1 | -10 |
| 1/1/2013 | 2 | 90 |

TABLE II
SNAPSHOT OF BASE TABLE AFTER INSERTING THREE RECORDS

| Facts | | | | | | | |
|---|---|---|---|---|---|---|---|
| Main | | | | Delta | | | |
| ID | Date | Prod | Amt | ID | Date | Prod | Amt |
| 1 | 1/1/2013 | 1 | 100 | | | | |
| 2 | 1/1/2013 | 1 | -50 | | | | |
| 3 | 1/1/2013 | 2 | 30 | | | | |
| 4 | 1/1/2013 | 2 | 60 | | | | |
| 5 | 1/2/2013 | 1 | -10 | | | | |
| | | | | 6 | 1/2/2013 | 1 | 20 |
| | | | | 7 | 1/1/2013 | 3 | 50 |
| | | | | 8 | 1/1/2013 | 3 | -10 |

TABLE III
CALCULATION OF FRESH AGGREGATE BY COMBINING VIEW AND AGGREGATE (a) Materialized aggregate table

| Aggregates | | |
|---|---|---|
| Date | Prod | SUM(Amt) |
| 1/1/2013 | 1 | 50 |
| 1/2/2013 | 1 | -10 |
| 1/1/2013 | 2 | 90 |

(b) Aggregated delta

| Aggregates | | |
|---|---|---|
| Date | Prod | SUM(Amt) |
| 1/2/2013 | 1 | 20 |
| 1/1/2013 | 3 | 40 |

(c) Combined fresh aggregate

| Aggregates | | |
|---|---|---|
| Date | Prod | SUM(Amt) |
| 1/1/2013 | 1 | 50 |
| 1/2/2013 | 1 | 10 |
| 1/1/2013 | 2 | 90 |
| 1/1/2013 | 3 | 40 |

Fig. 9

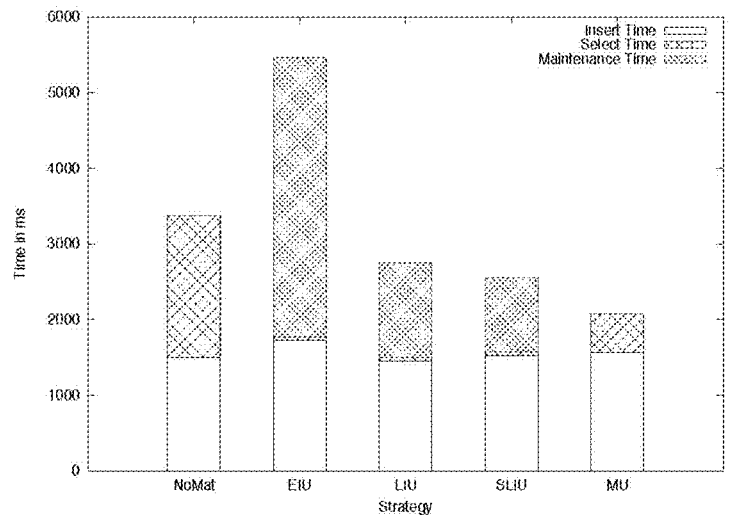
(a) 1 million records in the base table.
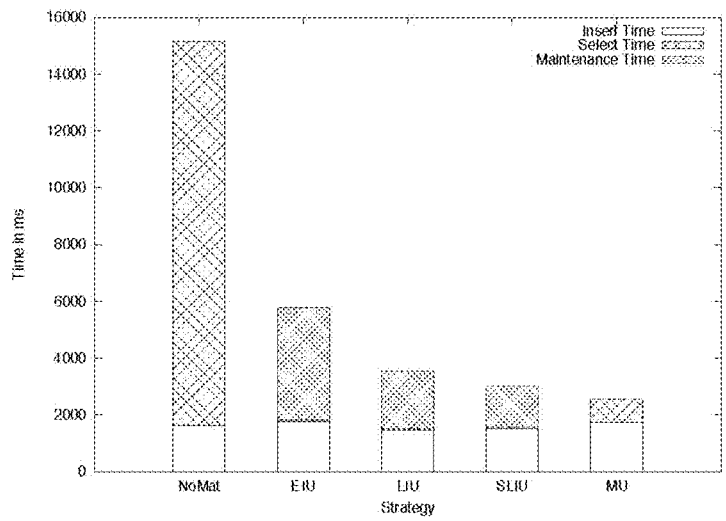
(b) 10 million records in the base table.
Fig 13

AGGREGATE QUERY-CACHING IN DATABASES ARCHITECTURES WITH A DIFFERENTIAL BUFFER AND A MAIN STORE

CROSS-REFERENCE TO RELATED APPLICATIONS

This application claims priority to U.S. Provisional App. No. 61/810,730 filed Apr. 11, 2013, which is incorporated herein by reference.

TECHNICAL FIELD

The invention relates to a database system for both online transaction processing (OLTP) and online analytical processing (OLAP). In particular, the invention relates to such a database system with a cache controller for caching the result of a query. Further, the invention relates to a corresponding method implemented on such a database system, to corresponding computer program products, and to corresponding implementing and using techniques.

BACKGROUND

In the prior art, such database systems that are suitable for both online transaction processing and online analytical processing have been designed as what is referred to as in-memory database systems. These database systems use main memory instead of disks to store transaction records. In order to provide both online transaction processing, which is write intensive, and online analytical processing, which is read intensive, the transaction records are organized into two data structures: a main store, which typically is a read-optimized, column-oriented data structure that uses data compression; and a differential buffer, which typically is a write-optimized and column-oriented data structure. The records stored in the differential buffer in conjunction with the records stored in the main store represents the current state of the data. The differential buffer also facilitates a column-oriented, but less compressed data structure that can be updated efficiently. To derive a consistent (=valid, correct, up-to-date) view, read operations must access the main store as well as the differential buffer, while data modifying operations manipulate the differential buffer only. A database architecture that uses a main store and a differential buffer in the above described way is referred to as a "Main/Delta-Architecture".

The differential buffer grows with every write operation. This decreases read performance because an increased part of the data has to be accessed via a non read-optimized data structure, the differential buffer. To compensate for this effect, the differential buffer and the main store are merged from time to time within the so-called merge process. Such an approach of using a differential buffer for write operations and merging the data of the differential buffer with the main store is described in the book "In Memory Data Management" by Hasso Plattner and Alexander Zeier.

Analyzing records frequently requires calculating aggregates of columns. While in conventional disk-based databases calculating such aggregates is time and resource consuming, modern in-memory database system allow for calculating these aggregates on-the-fly. First, access to main memory is faster than access to disk. Further, column-oriented data structure of modern in-memory database system allows for even faster access to the data that is stored consequentially in a column because CPU manufacturers implement pre-fetching algorithms that will load co-located data into extremely fast CPU cache as soon as the first load is finished. This reduces one of the problems associated with loading data from memory, namely that loading data incurs additional loading latencies, which is why an executing program may frequently stall. This is advantageous because the alternative to calculating aggregates on-the-fly, which is materializing aggregates, requires both memory and computational costs, in particular for maintaining materialized aggregates whenever the base data is changed. Further, the feasibility of calculating aggregates on-the-fly provides the user with the flexibility to construct any imaginable query straightaway.

With these columnar in-memory databases, OLTP and OLAP applications do not have to be separated into different systems anymore. Having the most recent transactional information at hand allows for users of Business Intelligence (BI) applications to run reports always on the most recent data. In traditional information systems, BI applications operate on pre-aggregated data sets that have been calculated in the past to quickly provide data for certain pre-defined reports. This traditional approach limits the amount of freedom for the user to change the granularity or degree of information. Given a report that shows the sales of a product per country, if the user would like to drill down into a country to investigate, for example, the sales per region, this is only possible if the information has been pre-aggregated. Therefore, he or she would have needed to know a long time ago that this is a report he or she may want to look at. With in-memory technology it is not necessary to store pre-aggregated results in the database anymore. Any query can be calculated on the fly. This will fundamentally change the way management reporting will be done and decisions will be made in the future. Even for enterprise level dataset sizes, in-memory column-oriented databases allow to execute typical analytical queries within under a second.

Despite these tremendous advantages over traditional disk-based database systems, technical problems, however, may still arise in columnar in-memory databases based on a main-delta architecture:

Calculating analytical queries on-the-fly in less than a second is achieved by massive parallelization of data processing. Each processor core works on a subset of the total amount of data tuples. Therefore, even for a single query execution, there is a high level of hardware utilization. This leads to slower query execution when many queries are run in parallel. Because queries can be calculated on-the-fly and thus can be used in an explorative manner, an even increased workload of OLAP queries containing aggregation operations is expected. Accordingly, when both large amounts of data and many parallel user accesses must be handled or when processing huge amounts of data with complex query and join criteria, aggregation calculation may still require several seconds or even minutes. This is longer than the typical human reaction time, which is in the order of several hundred milliseconds, so that the user will perceive the calculation of the query as waiting time. Therefore, the user's mind may even start wandering of to other topics, which is a process that cannot consciously be controlled.

Calculation of queries can be significantly accelerated by using materialized aggregates with pre-calculated data. However, this speed-up comes at the cost of aggregates maintenance which is necessary to guarantee consistency when the underlying data changes. The underlying data is also referred to as the "base table(s)". While strategies for maintaining cached aggregates are well established in academia and industry for conventional disk-based database systems, none of these known strategies takes into account the particularities of columnar in-memory database systems having a main store and a differential buffer.

Strategies of how to perform view invalidation are focus of the work by K. S. Candan, D. Agrawal, C. Divyakant, O. Po, W. S. Li, L. Oliver, and W.-P. Hsiung, "View invalidation for dynamic content caching in multitiered architectures", 2002. They do not provide a specific database architecture, which is why they their invalidation strategy is very complex and comes at high computational costs.

In "Maintenance of Data Cubes and Summary Tables in a Warehouse", I. S. Mumick, D. Quass, and B. S. Mumick present a concept for efficiently updating a materialized view. This concept, however, relates to an OLAP-only system. Therein, the stored materialized views are updated at regular intervals, typically at night when maintenance downtime of the OLAP-only system is acceptable. Because the system is an OLAP-only system that updates its materialized aggregate only at regular time intervals, this system cannot guarantee to provide up-to-date results. When a user submits a request relating to the materialized view to the system, in most cases, the system will return a result that is already outdated because the data forming the basis of the materialized aggregate, which is typically stored in a separate OLTP system, has already changed. Further, this system requires storing those records that have been inserted or modified since the last update of the materialized aggregate in duplicate: once in the underlying OLTP system for the purpose of archiving them and once in a separate store for the purpose of updating the materialized aggregate.

SUMMARY OF THE INVENTION

The present invention addresses the prior art problems in that it introduces a new strategy for maintaining cached aggregates into the world of in-memory database systems that takes into account and takes advantage of database architectures with a main store and a differential buffer.

The invention relates to computer system with the features of independent claim 1. This computer system is suitable for both online transaction processing and online analytical processing. The computer system may be distributed system.

The computer system comprises a processor and a database coupled to the processor, the database comprising: a main store for storing records, a differential buffer for receiving and buffering added or deleted or modified records, the differential buffer being coupled to the main store, preferably so that buffered records can be merged into the main store, a schema comprising records stored in the main store and records stored in the differential buffer, and a cache store for caching a result of a query against the schema. The schema may therefore be referred to as the base schema of the query. Both the main store and the differential buffer preferably store records in a column-oriented way.

The main store, the differential buffer, and the cache store are data structures. Examples of a main store and a differential buffer coupled with the main store, preferably so that buffered records can be merged into the main store, are described in the book "In Memory Data Management" by Hasso Plattner and Alexander Zeier. Preferably, the main store is dictionary encoded. In other words, the attribute values are encoded via a sorted dictionary into integers. This is advantageous because compression is high and scanning the attributes is very fast. Preferably, the differential buffer is encoded via a separate, unsorted dictionary. Preferably, when the differential buffer is merged into the main store, a new dictionary (per attribute) is generated.

The main store may consist of more than one partition. For example, the main store may consist of an active and a passive partition so that the records stored in the main store is horizontally partitioned into the active and the passive partition.

The query is a request for information retrieval from memory means, such as a database or information systems. Calculating the query preferably involves calculating an aggregate function. In other words, the query preferably contains an aggregation function. Therefore, herein, the result of the query sometimes is also referred to as the "aggregate". An aggregate function is a function where the values of multiple rows are grouped together as input on certain criteria to form a single value of more significant meaning or measurement such as a set, a bag or a list. SQL aggregate functions, for example, return a single value, calculated from values in a column. Aggregate functions include: AVG( )—Returns the average value from the given table; COUNT( )—Returns the number of rows; FIRST( )—Returns the first value; LAST( )—Returns the last value; MAX( )—Returns the largest value; MIN( )—Returns the smallest value; and SUM( )—Returns the sum. According to an advantageous embodiment, the aggregate function contained in the query preferably is a distributive or an algebraic aggregate function. Distributive aggregate functions can be computed by partitioning their input into disjoint sets, aggregating each set individually, then further aggregating the (partial) results from each set into the final result. Examples are SUM, MIN, MAX, and COUNT. Algebraic aggregate functions can be expressed as a scalar function of distributive aggregate functions. AVG is algebraic because it can be calculated from the distributive aggregate functions SUM and COUNT. Holistic aggregate functions cannot be computed by dividing into parts. Median is an example of a holistic aggregate function. According to an advantageous embodiment, the query does not contain a holistic aggregate function. If the schema is not a one-table schema, then a query may involve joining two tables or joining multiple tables (or table partitions) of the schema and applying an aggregate function on the result of this join or the results of these joins.

The result of a query is also referred to as "view". A cached result of a query is also referred to as "materialized view". When calculating a query requires calculating at least one aggregation function, then a cached result of this query is referred to as "materialized aggregate".

The computer system further comprises a cache controller executable by the processor and communicatively coupled to the database. The cache controller is configured for storing the result of the query in the cache store; receiving an analytical request; and determining, in response to the received request, an up-to-date result of the query by: accessing the cache store to obtain the cached result; determining the records of the schema that have been added or deleted or modified since the step of storing the cached result in the cache store on the basis of the records stored in the differential buffer; and incrementally deriving the up-to-date result from the cached result and from the records determined in the latter step. The term "up-to-date result" is to be understood as a result that is identical to the result obtained when running the query against the entire schema, that is, against all the records of the schema that are stored in the differential buffer and all the records of the schema that are stored in the main store.

This computer system implements a new aggregate maintenance strategy that is advantageous because it takes into account that records of the database are kept in two data structures: The first data structure is a differential buffer, which receives new records, such as additions, deletions, and modifications. The second data structure is a main store, which does not receive new records unless the content of the differential buffer is merged into the main store. In order to obtain an up-to-date result, the up-to-date result is incrementally derived from the cached result and from the recently added or deleted or modified records that are derivable from the differential buffer. When the differential buffer is kept small in comparison to the main store by frequently merging the content of the differential store into the main store, the average time for calculating the up-to-date result is reduced significantly. Moreover, it is not required to store in duplicate all those records that have been inserted or modified since the last update of the materialized aggregate. This is because these are derivable from the differential buffer.

Advantageous embodiments of the computer system according to claim 1 are laid out in the dependent claims 2-13.

According to an advantageous embodiment of the computer system, the database further comprises a cache management store for storing an existence indicator indicating whether the cached result exists or not. The existence indicator may indicate that the cached result does not exist by being empty or non-existent itself. The cache controller is further configured for: determining, in response to the received request, an up-to-date result of the query by: checking the existence indicator as to whether there is a cached result of the query in the cache store, and if there is a cached result of the query in the cache store, accessing the cache store to obtain the cached result as the up-to-date result of the query; or if there is no cached result of the query in the cache store, taking alternative action comprising running the query against the entire schema in order to obtain the up-to-date result.

According to an advantageous embodiment of the computer system, the database is such that none of the records in the main store can be invalidated. Then the records that have been added or deleted or modified since the step of storing the cached result in the cache store on the basis of the records stored in the differential buffer are exactly those records that are stored in the differential buffer. This embodiment is advantageous because the step of determining the added or deleted or modified records comes at zero computational cost.

According to an advantageous embodiment of the computer system, the step of incrementally deriving includes: running the query against those records of the schema that have been added or deleted or modified between the step of storing the cached result in the cache store and the step of receiving the request; and combining the results of the latter query with the accessed cached result in order to obtain the up-to-date result. Combining these results preferably involves running a "union all" operation against the latter two results to obtain an intermediary result and subsequently running the query against this intermediary result. This is particularly advantageous, when the schema consists of only one table, i.e., the schema is a one-table schema. For then only a single query must be run, the one against the records of the table that are stored in the differential buffer. However, this is not be construed as that the step of determining an up-to-date result cannot comprise additional steps. Additional steps may be required to obtain the up-to-date result, in particular, when the schema consists of multiple tables. Then each table may be partitioned into a main store and a differential buffer and determining the up-to-date result may involve joining table partitions stored of the main store with table partitions stored in the differential buffer and running the query against these joins. Further, deriving the up-to date result may then involve combining the result of running the query against those records of the schema that are stored in the differential buffer (the join of all table partitions that are stored in the differential buffer), the results of running the query against the joins of other table partitions and the cached result.

According to an advantageous embodiment of the computer system, the cache controller is configured for maintaining the cached result equal to the result of running the query against the records of the schema that are stored in the main store. According to an advantageous embodiment, the database comprises a cached result stored in the cache store, the stored cached result being equal to the result of running the query against the records of the schema that are stored in the main store. These embodiments are advantageous because, for incrementally deriving the up-to-date result, no calculation of the join between the main store table partitions is required when the schema is a multi-table schema. When the schema is a one-table schema, incrementally deriving the up-to-date result merely requires: accessing the cache store to obtain the cached result; running the query against the differential buffer; and combining the results of the latter two steps in order to obtain the up-to-date result.

According to an advantageous embodiment of the computer system, the database further comprises: a cache management store for storing a validation indicator indicating whether the cached result is still valid or not. Again, the cache controller is configured for determining, in response to the received request, an up-to-date result of the query. According to this advantageous embodiment, the cache controller performs flow control in dependence of the validation indicator stored in the cache management store. For determining the up-to-date result of the query in response to the received request, the cache controller is configured for checking the validation indicator of the cache management store as to whether the cached result is still valid; if the cached result is still valid, accessing the cache store to obtain the cached result as the up-to-date result; or if the cached result is not valid, taking alternative action comprising the following steps: accessing the cache store to obtain the cached result; incrementally deriving the up-to-date result from the cached result and from the records determined in the previous step. This embodiment is advantageous because the query is not run against those records of the schema that are stored in the differential store if the cached result is flagged as still valid. This reduces time and computational cost for calculating an up-to-date result.

According to another advantageous embodiment of the computer system, the database further comprise: a cache management store for storing an existence indicator indicating whether the cached result exists or not and a validation indicator indicating whether the cached result is still valid or not. The existence indicator may indicate that the cached result does not exist by being empty or non-existent itself. Again, the cache controller is configured for determining, in response to the received request, an up-to-date result of the query. According to this advantageous embodiment, the cache controller performs flow control in dependence of the validation indicator and the existence indicator stored in the cache management store. For determining the up-to-date result of the query in response to the received request, the cache controller is configured for checking the existence indicator of the cache management store as to whether there is a cached result of the query in the cache store, and, if there is a cached result of the query in the cache store, checking the validation indicator of the cache management store as to whether the cached result is still valid; if the cached result is still valid, accessing the cache store to obtain the cached result as the up-to-date query; or, if the cached result is not valid, taking alternative action comprising: accessing the cache store to obtain the cached result; and incrementally deriving the up-to-date result from the cached result and from the records determined in the previous step; and, if there is no cached result of the query in the cache store, taking alternative action comprising running the query against the entire schema. Preferably, if there is no cached result of the query in the cache store, the cache controller is configured for performing the following additional steps: checking whether the query is suitable for being cached depending on a cache admission policy; if the query is suitable for being cached, storing, as the cached result in the cache, the result of running the query against the entire schema and setting the existence indicator to true (=a cached result does exist). This embodiment is advantageous because it includes an additional switch, where the cache controller checks if the cache does exist or not. This switch is beneficial when it is a priori unknown which queries will be used by the users so that the result of query is only calculated when the user submits a query that requires calculating this query for the first time. This switch is also beneficial when calculating this query is required only infrequently or at irregular time intervals so that in many time intervals between two consecutive merger processes calculation of this query is not required. Then, the cached result may not be recalculated in the course of the merger process but discarded, and the existence indicator is set to false. These strategies are advantageous because less computational power is required.

According to another advantageous embodiment of the computer system, the database further comprise: a cache management store for storing a validation indicator indicating whether the cached result is still valid or not. Again, the cache controller is configured for determining, in response to the received request, an up-to-date result of the query. According to this advantageous embodiment, the cache controller performs flow control in dependence of the validation indicator and the existence indicator stored in the cache management store. For determining the up-to-date result of the query in response to the received request, the cache controller is configured for checking the existence indicator as to whether there is a cached result of the query in the cache store, and if there is a cached result of the query in the cache store, accessing the cache store to obtain the cached result as the up-to-date result of the query; or if there is no cached result of the query in the cache store, taking alternative action comprising running the query against the entire schema in order to obtain the up-to-date result.

According to an advantageous embodiment, the existence indicator is embodied by the hash value of the corresponding query, for example, a normalized SQL string. According to another advantageous embodiment, the existence indicator is a string that includes the unique table id, the grouping attributes, the aggregates, and the filter predicates of the query. The existence indicator equals true if this existence indicator is comprised by the cache management store. If the cache management store does not comprise this hash value, then the existence indicator equals false.

According to another advantageous embodiment of the computer system, the cache controller is further configured for updating the cached result.

According to another advantageous embodiment of the computer system, the cache controller is further configured for: selecting one of a plurality of maintenance strategies, such as no materialization, eager full update, eager incremental update, lazy update, smart lazy update, and merge update, wherein the selection is preferably carried out by a cost estimator; updating the cached result according to the selected maintenance strategy. The different maintenance strategies and the cost estimator are explained in the detailed description.

According to another advantageous embodiment of the computer system, the cache controller is configured for updating the cached result according to a merge update strategy, the merge update strategy comprising: accessing the cached query from the cache store during the merge; incrementally deriving the up-to-date result from the cached result and from the records determined in the previous step; and replacing the cached query in the cache with the up-to-date result of the query. This embodiment is advantageous when it is expected that use will be made of the cached result in the time interval between two merges. Then, the cached result can be calculated when the merge takes place. Advantageously, the cached result is calculated in an incremental way: rather than calculating it from the combined records in the main store after the merger, it is calculated from the records in the differential buffer and the cached result before the merger. This is more time and computational cost effective compared to calculating the updated cached result from the merged records in the main store after the merge because the amount of records in the differential buffer typically is much smaller than the amount of records in the main store.

According to another embodiment, the cache controller is further configured for deleting the cached result in the cache store and setting the existence indicator to false in response to the computer system initiating a merger of the records of the differential buffer into the main store.

According to an advantageous embodiment, the database is configured for merging the buffered records of the differential buffer into the main store in dependence of a plurality of factors. According to one embodiment, these factors include the optimal merge interval as described below. According to another embodiment, these factors include one or more of the following: number of reads $N_r$, number of writes $N_w$, the number of merge operations $N_m$, and the number of all records of the initial main storage $|C_M|$. These embodiments are advantageous because at some point the costs of aggregation outweigh the costs of a merger. The costs of the aggregates caching mechanism and the merge update maintenance strategy mainly depend on the aggregation performance on the delta storage which decreases linearly with an increasing number of records. However, the merge operation also generates costs that have to be considered. The costs of aggregation and the costs of a merger depend on the abovementioned factors. The number of records (=$Costs_{total}$) that are accessed during the execution of a given workload may be approximated as follows:

$$Costs_{total} = N_m \cdot \left(|C_M| + \frac{N_w}{2}\right) + N_r \cdot \frac{\frac{N_w}{2}}{N_m + 1}$$

A workload consists of a number of reads $N_r$ and a number of writes $N_w$. The number of merge operations is represented by $N_m$. The first summand represents the accesses that occur during the merge operations. Firstly, each merge operation has to access all records of the initial main storage $|C_M|$. Secondly, previously merged records and new delta entries are accessed as well. This number depends on the number of writes $N_w$ in the given workload divided by two (since the number of records in the delta increases linearly). The second summand determines the number of accesses for all reads $N_r$ on the delta. As before, the delta grows linearly and is speed-up by the number of merge operations $N_m$. The buffered records should be merged into the main store when this cost function is minimal. The minimum is calculated by creating the derivation of our cost model and by obtaining is root.

$$N_m = \frac{\sqrt{2 \cdot |C_M| \cdot N_w \cdot N_r + N_w^2 \cdot N_r} - 2 \cdot |C_M| - N_w}{2 \cdot |C_M| + N_w}$$

$N_m$ represents the number of merge operations. Dividing the total number of queries by $N_m$ returns the optimal merge interval.

According to another advantageous embodiment of the computer system, the cache controller is further configured for: validating the materialized query cached in the cache store in response to an insertion of new records into the differential buffer, preferably by: querying the query from the differential buffer to obtain a validation result; checking whether the validation result is empty or not; and setting the validation indicator of the cache management store to invalid if the validation result is not empty. This embodiment implements an advantageous cache (in-)validation strategy that takes into account the particularities of the architecture with the differential buffer and the main store. Not every insertion of new records into the differential buffer has an effect on (and thus invalidates) the result of the query. Because new insertions (which logically may add, delete, or modify a record) are first stored in the differential buffer, whether the insertion does have an effect or not can be determined by running the query against those records of the schema that are stored in the records stored in the differential buffer. If the result is empty, the insertion had no effect on the result of the query so that the cached result remains valid. This validation strategy is fast because the differential buffer generally is small.

According to another embodiment of the computer system, the cache controller is further configured for setting the validation indicator of the cache management store to invalid in response to an insertion of new records into the differential buffer.

According to another advantageous embodiment of the computer system, the cache management store contains a cache indicator indicating whether the result of the query is to be cached, wherein the cache controller is configured for: checking the cache indicator of the cache management store as to whether the result of the query is to be cached or not; if the result is not to be cached: running the query against the entire schema; if the result is to be cached, taking alternative action comprising determining an up-to-date result according to one of the above described embodiments. This embodiment is advantageous because caching of the query may be turned on and off. Not all queries should be cached. As already described, an extensive use of the caching mechanism is able to dramatically accelerate the query response time. However, caches are potentially space-consuming and since space is potentially cheap but not infinite. More cache entries lead to a higher maintenance overhead in the cache controller. If this overhead becomes higher than the potential savings, the cache is not an optimal solution anymore. An appropriate way of determining the overall benefit of a cached query, i.e., the time saved, is to calculate $t_{total} = n*t_\Delta - m*t_{rebuilt} - t_{create}$ where $t_\Delta$ is the difference in time the original query needed to the time it took to return the cached result. $t_{rebuilt}$ is the average time needed to update the cached result with the content of the delta and $t_{create}$ denotes the time needed for creating the cache line. n is the amount of cache hits and m the number of merges. Thus $n*t_\Delta$ denotes the benefit of the cache line and $m*t_{rebuilt} - t_{create}$ the overhead of maintaining the cache line. This formula does not take into account the lookup in the CMD, which is dependent on the total number of cache lines. The share of the lookup can be neglected. According to this embodiment, the overall benefit of each query may be calculated and persisted in the CMD once the workload is finished.

According to another advantageous embodiment of the computer system, the cache controller is further configured for: generating access statistics regarding the cached results, preferably storing them in the cache management store; and setting the cache indictor of the cache management store to caching or no caching in dependence of generated access statistics. This embodiment is advantageous because caching of the query may be turned on or off in dependence of the access statistics generated by the cache controller. When, for example, the cached result is accessed only very rarely and the costs of the corresponding on-the-fly query are low, the cache controller may set the corresponding cache indicator to false (=no caching). When, in contrast, the cached result is accessed frequently and the costs of the corresponding on-the-fly query are high, the cache controller may set the corresponding cache indicator to true (=caching). This way caching may automatically and dynamically be turned on and off in dependence of the past workload and the expected workload. Unless it is stated otherwise, calculating the result of a query on-the-fly means running the query against the records of both the main store and the delta store.

According to another advantageous embodiment of the computer system, the cache controller is further configured for: receiving queries; analysing the received queries over time; and setting the cache indictor of the cache management store to caching or no caching in dependence of this analysis. This embodiment is advantageous because caching of the query may be turned on or off in dependence of the queries received by the cache controller. When, for example, only few queries are received that are determined by calculating the query, the cache controller may set the corresponding cache indicator to false (=no caching). When, in contrast, many queries are received that are determined by calculating the query, the cache controller may set the corresponding cache indicator to true (=caching). This way caching may automatically and dynamically be turned on and off in dependence of the workload.

According to an advantageous embodiment, in order to limit the needed memory space and reduce the inherent computational overhead of the caching algorithm, the cache controller is configured for applying a cache admission policy so that only the most profitable aggregate queries are admitted to the cache. Evaluation may take place at query execution time for cache admission and replacement and during the merge process to determine which aggregate queries to incrementally maintain or to evict from the cache. There are two approaches to determine whether to cache an aggregate query after it has been executed: The first way is to measure the execution time of the aggregate query and only cache queries that are above a system defined threshold. Another way is to calculate the profit of using a cached query over an on-the-fly aggregation. The definition of the profit for query $Q_i$ can be described with the execution time for the aggregation on the main store $AggMain_i$ and differential buffer $AggDelta_i$ divided by the time to access a cached aggregate query $AggCached_i$ and the execution time of the aggregation on the delta storage $AggDelta_i$.

$$\text{profit}(Q_i) = \frac{AggMain_i + AggDelta_i}{AggCached_i + AggDelta_i}$$

This profit metric will change when the delta storage grows, but it is a good initial indicator to decide which queries to admit to the cache. The cache controller may be configured to replace queries with lower profits or execution times by incomings queries with higher profits or execution times when the cache size reaches a system-defined size limit. The cache controller may be configured to decide which cached query to incrementally update or evict from the cache during the merge process. For this process, the cache controller may be configured to use another metric that includes the average frequency of execution $\lambda_i$ of query $Q_i$ which is calculated based on the $K_i$th last reference and the difference between the current time t and the time of the last reference $t_K$:

$$\lambda_i = \frac{K_i}{t - t_K}$$

The profit of a query $Q_i$ can then be extended as follows:

$$\text{profit}(Q_i) = \frac{\lambda_i \cdot (AggMain_i + AggDelta_i)}{AggCached_i + AggDelta_i}$$

According to another advantageous embodiment of the computer system, the database preferably is a column-oriented, in-memory database. According to another advantageous embodiment of the computer system, the cache controller comprises an SQL query interface for receiving queries so that the cache controller mimics the interface of the database. This embodiment is advantageous because any client that used to be able to interact with an SQL database can still behave as before by simply communicating with the cache controller. The cache controller effectively acts as a proxy.

According to another advantageous embodiment of the computer system, the cache controller is further configured for receiving a query. For this purpose, the cache controller may comprise a query interface, such as a SQL query interface, which can be coupled to a client. The cached query may be identical to the received query, an exact subquery of the received query, or a superquery of the received query.

According to another embodiment of the computer system, the cache controller is configured for analysing the received query and decomposing the received query into subqueries. The query may be identical to the one of the subqueries.

According to an embodiment of the computer system, the cache controller is configured for analysing the hierarchy of different queries that can be received by the cache controller; and for using the cached result to create the result of the received query by the cached result. In this case, the cached result is the result of a superquery.

According to another embodiment of the computer system, the cache is only aware of exact queries. That means that a cache hit will only be found for a query that has already occurred before in exactly the same manner, i.e., the two queries have the same filter predicates. The combination of grouping attributes and aggregates are, however, irrelevant as to whether the two queries are understood as exactly the same. According to this embodiment, an existing cache does not answer parts of queries other than its corresponding query.

According to another embodiment of the computer system, exact subquery caching approach is implemented. Suppose the cache controller processes a query like in the following listing (Schema UNION SQL query that is combinable from cache entries):

(SELECT foo FROM b a r WHERE zoo) UNION (SELECT foo FROM b a r WHERE z a r)

Even if the query itself has not been cached yet, the creation of the new cache entry may exploit the fact that e.g. the two subqueries are already cached. The cache controller searches an incoming query for sub-selects with the help of an integrated SQL parser component. If such a subquery is found and it is already cached, the cache controller modifies the overall query by only replacing the cached subquery with a SELECT subquery against those records of the schema that are stored in the cache.

According to another embodiment of the computer system, what is referred to as drilldown subquery caching is implemented via a query controller that is part of the cache controller. A typical workload contains several drilldown patterns. Such succeeding queries are created when clients perform an explorative drilldown into data by consecutively adding new criteria or aggregations based on previously-used queries. Such succeeding drilldown queries form a kind of hierarchy. To exploit this fact, a hierarchy-aware cache mechanism is implemented that uses previously-stored caches for superqueries to create the results of subqueries by, for example, simply adding more criteria or aggregations. Note that this kind of query caching requires a sophisticated query analysis. Based on a certain set of rules, the query controller finds appropriate superqueries in the set of cached queries. Among this found set, it chooses the best, i.e., the most concrete or limiting query—the more a query limits the result set, the less operations would have to be added by the cache controller. Based on the potentially found superquery, the missing selection criteria, projections and aggregations are applied on the already-cached superquery result in order to fulfil the requirement of delivering correct results. This mechanism can be extended, for instance, by respecting value ranges of the selection criteria. The drilldown subquery approach is explained with reference to the following queries:

(i)

SELECT a, b
FROM foo
WHERE b > 0 AND b < 20

(ii)

SELECT a
FROM foo
WHERE b > 0 AND b < 20 AND a = 5

```
(iii)

SELECT a, SUM(b)
FROM foo
WHERE b > 0 AND b < 20
GROUP BY a (iv)

SELECT a, b
FROM foo
WHERE b > 5 AND b < 15

(v)

SELECT b
FROM foo
WHERE b > 0
```

If query (i) is already cached, the queries (ii)-(iv) can use the cached results for their answer because they only remove projection columns, add selection criteria or add group-by clauses. Query (v) cannot make use of the cache because it potentially includes tuples that are not available in the cache.

According to an advantageous embodiment, the cache controller is configured for automatically identifying drill-down columns and adding them to a cache line in order to match more subsequent queries.

According to another embodiment, the differential buffer is an insert-only data structure in the sense that records are only removed during merge of the buffered records into the main store or under exceptional circumstances. Further, the main store is an insert-only data structure so that records are only removed under exceptional circumstances (archiving the data after a certain period of time, etc.).

According to an advantageous embodiment, records can still be modified even when the differential buffer and the main store are insert-only data structures. For this purpose, the database comprises an additional data structure, a record validity store, that indicates which of the records stored in the main store and/or the differential buffer are still valid. This data structure may be implemented as a simple bit vector that has a bit for each record, that bit indicating whether its respective record is still valid or not (e.g., 0=invalid and 1=valid). This way, for example, a record stored in the main store can be updated by flagging it as invalid and introducing an updated record in the differential buffer.

According to an advantageous embodiment, the database comprises an additional data structure, a cached record validity store for storing the record validity store at the time of creating or updating the cached result. According to this embodiment, the cache controller is further configured for: comparing the cached record validity store with the (current) record validity store in order to determine all records in the main store that have been invalidated after the creation of the cached query; taking these invalidated records into account when, as applicable, determining an up-to-date result of the query or when updating the cached result of the query.

According to an advantageous embodiment, for every update or delete, additional checks are performed when the query contains a min and/or max function because these are not self-maintainable. For deletes, it is checked if the deleted tuple is a min or max tuple. For updates, it is checked if the updated value is higher than a cached max aggregate or lower than a cached min aggregate. If that is the case, the cached query is invalidated.

According to an advantageous embodiment, the database is comprised by the computer system.

According to an advantageous embodiment, the cache management store is a cache management table.

According to an advantageous embodiment of the computer system, the cache controller comprises a garbage collection mechanism for eliminating cached queries that are not worthwhile to store in the cache store. As the number of distinct queries grows in the cache and years go by, there are queries stored that are not executed frequently anymore. In practice, a cache will be limited in size. Once a query has been cached and re-executed we know the execution time for both cases, cached and uncached. The garbage collection mechanism can then calculate the benefit of caching this query. According to an advantageous embodiment, the garbage collection mechanism sorts the queries by benefit. According to an advantageous embodiment, the garbage collection mechanism may only keep the top-k queries that have an accumulated size smaller or equal to the size of the cache. This, however, does not take access patterns over time into account. If e.g. a report for the year 2008 has been often executed in the beginning of 2009 (resulting in a high benefit), it might not be used as often any more but still have a fairly good benefit based on its previous accesses. According to another advantageous embodiment, the garbage collection mechanism just calculates the benefit for a given time period, e.g., the last 30 days. According to another advantageous embodiment, the garbage collection mechanism linearly downgrades the time saving per access over time, implementing a kind of aging mechanism. If a query was accessed yesterday, the benefit for that access is smaller than the benefit of the query execution today.

According to an advantageous embodiment, the schema comprised by the database is only a single table in the sense that the schema is a one-table schema.

Another advantageous embodiment relates to a computer system for both online transaction processing and online analytical processing, comprising: a processor; a database coupled to the processor, the database comprising: a main store for storing records, a differential buffer for receiving and buffering added or deleted or modified records, the differential buffer being coupled to the main store for merging buffered records into the main store, a one-table schema comprising records stored in the main store and records stored in the differential buffer, and a cache store for caching a result of a query against the schema; and a cache controller executable by the processor and communicatively coupled to the database, the cache controller being configured for: storing the result of the query in the cache store; receiving an analytical request; and determining, in response to the received request, an up-to-date result of the query by: accessing the cache store to obtain the cached result; running the query against the differential buffer; and incrementally deriving the up-to-date result by combining the cached result and the result obtained from the latter step.

Another advantageous embodiment relates to a computer system for both online transaction processing and online analytical processing, comprising: a processor; a database coupled to the processor, the database comprising: a main store for storing records, a differential buffer for receiving and buffering added or deleted or modified records, the differential buffer being coupled to the main store for merging buffered records into the main store, a multi-table schema comprising multiple tables, wherein each table is partitioned into the main store and the differential buffer, each of the partition being suitable for storing records, and a cache store for caching a result of a query against the schema; and a cache controller executable by the processor and communicatively coupled to the database, the cache controller being configured for: storing the result of the query in the cache store; receiving an analytical request; and determining, in response to the received request, an up-to-date result of the query by: accessing the cache store to obtain the cached result; calculating all joins of the partitions of the schema necessary for calculating the join of all tables except the join of all partitions that are stored in the main store; running the query against each of the joins calculated in the previous step; and incrementally deriving the up-to-date result by combining the cached result and the result obtained from the previous step.

The invention further relates to a computer system for both online transaction processing and online analytical processing, comprising:
  a processor;
  a database coupled to the processor, the database comprising:
    a main store for storing records,
    a differential buffer for receiving and buffering added or deleted or modified records, the differential buffer being coupled to the main store,
    a one-table schema comprising records stored in the main store and records stored in the differential buffer, and
    a cache store for caching a result of a query against the schema; and
  a cache controller executable by the processor and communicatively coupled to the database, the cache controller being configured for:
    storing the result of the query in the cache store;
    receiving an analytical request; and
    determining, in response to the received request, an up-to-date result of the query by (216):
      accessing the cache store to obtain the cached result;
      running the query against the differential buffer; and
      incrementally deriving the up-to-date result by combining the cached result and the result obtained from the latter step.

The invention further relates to a computer system for both online transaction processing and online analytical processing, comprising:
  a processor;
  a database coupled to the database, the database comprising:
    a main store for storing records,
    a differential buffer for receiving and buffering added or deleted or modified records, the differential buffer being coupled to the main store,
    a multi-table schema comprising multiple tables, wherein each table is partitioned into the main store and the differential buffer, each of the partition being suitable for storing records, and
    a cache store for caching a result of a query against the schema; and
  a cache controller executable by the processor and communicatively coupled to the database, the cache controller being configured for:
    storing the result of the query in the cache store;
    receiving an analytical request; and
    determining, in response to the received request, an up-to-date result of the query by:
      accessing the cache store to obtain the cached result;
      calculating all joins of the partitions of the schema necessary for calculating the join of all tables except the join of all partitions that are stored in the main store;
      running the query against each of the joins calculated in the previous step; and
      incrementally deriving the up-to-date result by combining the cached result and the result obtained from the previous step.

The invention further relates to a method as described herein.

The invention further relates to a method implemented in a computer system for both online transaction processing and online analytical processing, comprising the steps of:
  providing the computer system that comprises:
    a processor;
    a database coupled to the processor, the database comprising:
      a main store for storing records,
      an differential buffer for receiving and buffering records, the differential buffer being coupled to the main store,
      a schema comprising records stored in the main store and records stored in the differential buffer,
      a cache store for caching a result of a query against the schema, and
      a cache management store for storing a validation indicator indicating whether the cached result is still valid or not; and
    a cache controller executable by the processor and communicatively coupled to the database; and
  the cache controller performing the following steps:
    receiving an analytical request; and
    determining, in response to the received request, an up-to-date result of the query by: checking the validation indicator of the cache management store as to whether the cached result is still valid;
    if the cached result is still valid, accessing the cache store to obtain the cached result as the up-to-date result; or
    if the cached result is not valid, taking alternative action comprising:
      accessing the cache store to obtain the cached result;
      determining the records of the schema that have been added or deleted or modified since the step of storing the cached result in the cache store on the basis of the records stored in the differential buffer; and
      incrementally deriving the up-to-date result from the cached result and from the records determined in the previous step.

The invention further relates to a method implemented in a computer system for both online transaction processing and online analytical processing, comprising the steps of:
  providing the computer system that comprises:
    a processor;
    a database coupled to the processor, the database comprising:
      a main store for storing records,
      a differential buffer for receiving and buffering new records, the differential buffer being coupled to the main store,
      a schema comprising records stored in the main store and records stored in the differential buffer,
      a cache store for caching a result of a query against the schema, and
      a cache management store for storing an existence indicator indicating whether the cached result exists or not and a validation indicator indicating whether the cached result is still valid or not; and
    a cache controller executable by the processor and communicatively coupled to the database; and the cache controller performing the following steps:
receiving an analytical request; and
determining, in response to the received request, an up-to-date result of the query by: checking the existence indicator of the cache management store as to whether there is a cached result of the query in the cache store, and
if there is a cached result of the query in the cache store, checking the validation indicator of the cache management store as to whether the cached result is still valid;
if the cached result is still valid, accessing the cache store to obtain the cached result as the up-to-date result of the query; or
if the cached result is not valid, taking alternative action comprising:
accessing the cache store to obtain the cached result; and
determining the records of the schema that have been added or deleted or modified since the step of storing the cached result in the cache store on the basis of the records stored in the differential buffer; and
incrementally deriving the up-to-date result from the cached result and from the records determined in the previous step;
if there is no cached result of the query in the cache store taking alternative action comprising running the query against the entire schema.

The invention further relates to a method implemented in a computer system for both online transaction processing and online analytical processing, comprising the steps of:
providing the computer system that comprises:
a processor;
a database coupled to the processor, the database comprising:
a main store for storing records,
an differential buffer for receiving and buffering new records, the differential buffer being coupled to the main store,
a schema comprising records stored in the main store and records stored in the differential buffer,
a cache store for caching a result of a query against the schema, and
a cache management store for storing an existence indicator indicating whether the cached result is still valid or not; and
a cache controller executable by the processor and communicatively coupled to the database; and
the cache controller performing the following steps:
receiving an analytical request; and
determining, in response to the received request, an up-to-date result of the query by: checking the existence indicator as to whether there is a cached result of the query in the cache store, and
if there is a cached result of the query in the cache store, accessing the cache store to obtain the cached result as the up-to-date result of the query; or
if there is no cached result of the query in the cache store, taking alternative action comprising running the query against the entire schema in order to obtain the up-to-date result.

The invention further relates to a non-transitory computer-readable medium comprising a plurality of machine-readable instructions which, when executed by one or more processors, are adapted to cause the one or more processors to perform a method as described herein.

The skilled person understands which of the above aspects and embodiments are combinable with each other. The skilled person further understands that the advantageous embodiments relating to computer systems configured to carry out certain steps are also implementable as methods comprising these steps.

DESCRIPTION OF THE DRAWINGS

FIG. 9 shows different example tables.

FIG. 13 shows results of benchmarks carried out using a workload consisting of both OLTP-style and OLAP-style queries.

Like reference symbols in the various drawings indicate like elements.

DETAILED DESCRIPTION

In the following description, for the purpose of explanation, an example embodiment of the invention is described. The specific details are set forth in order to provide a thorough understanding of the example embodiments. It will be evident, however, to one skilled in the art that the present invention may be practiced without these specific details.

A.

Cache Controller

Figure 1:
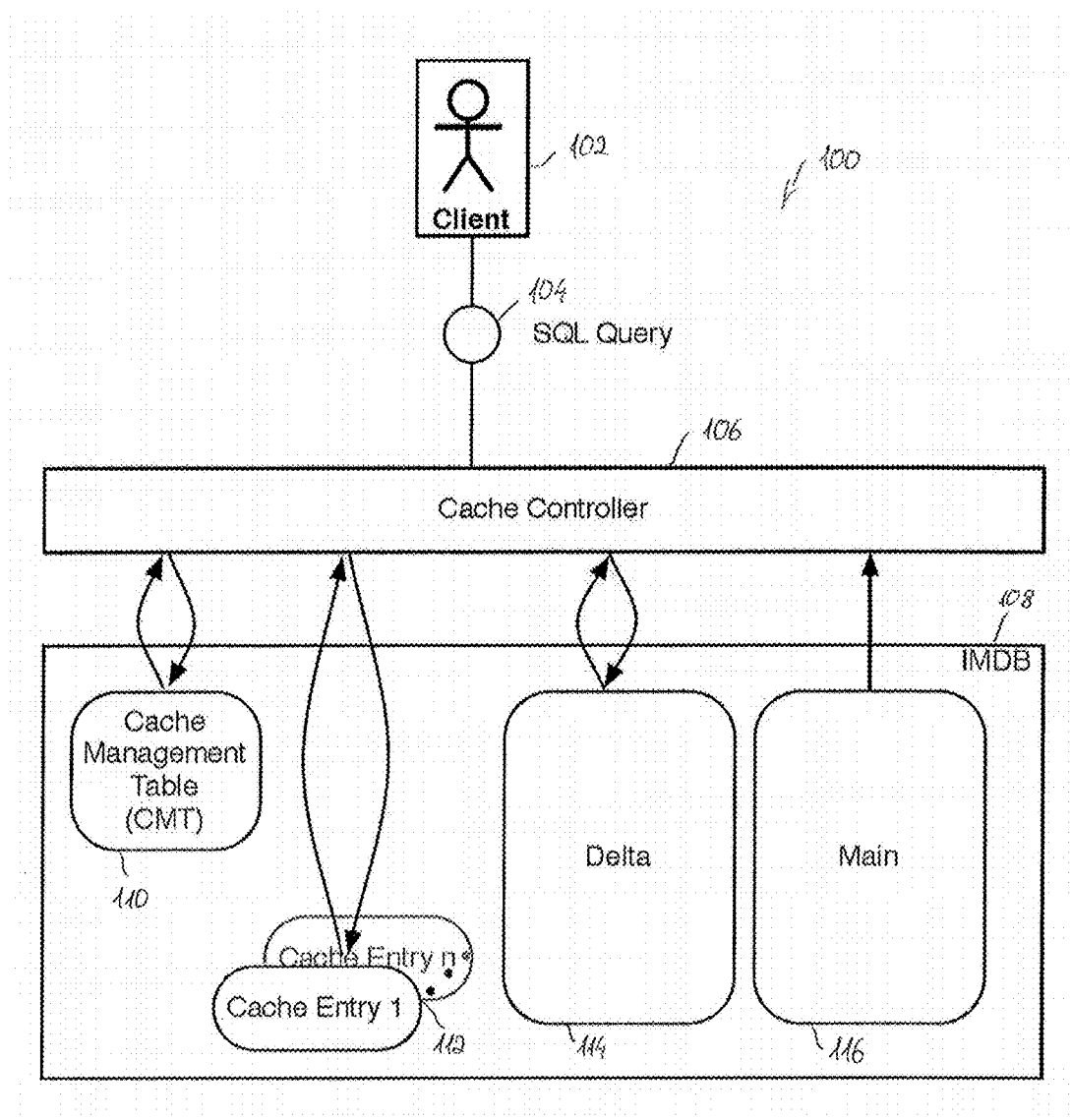
FIG. 1 shows an architecture of a computer system according to the invention as a fundamental modeling concept (FMC) diagram.

An example embodiment is shown in FIG. 1, the example embodiment being a computer system 100 comprising a processor, a database 108 coupled to the processor, the database comprising: a main store 116 for storing records, a differential buffer 114 for receiving and buffering new records, the differential buffer being coupled to the main store, preferably for merging buffered records into the main store, and a cache store 112 for caching a result of a query. The computer system 100 further comprises a cache controller 106 executable by the processor and communicatively coupled to the database 108. The cache controller 106 provides an application transparent cache mechanism. This cache mechanism takes advantage of the main-delta architecture (i.e., the database comprising the main store 116 and the differential buffer 114) and is used to reduce computational costs and the average time for determining an up-to-date result of a query. While there has been research for many years on this topic, publications often focused on optimization of OLAP only workloads. This is because combined OLAP and OLTP workloads on a single data set had not been feasible in the past. The cache mechanism according to this embodiment takes into account combined OLAP and OLTP workload, including insert statements as well as complex aggregation queries, and implements effective cache-invalidation and -revalidation strategies.

For this purpose, the cache controller 106 is configured for: storing a result of the query in the cache store; receiving an analytical request; and determining, in response to the received request, an up-to-date result of the query by 216: accessing the cache store to obtain the cached result; determining the records of the schema that have been added or deleted or modified since the step of storing the cached result in the cache store on the basis of the records stored in the differential buffer; and incrementally deriving the up-to-date result from the cached result and from the records determined in the latter step.

In the following, the advantageous concepts of the embodiment (see Section A.I. Concepts) and their performance compared to a traditional caching and no caching (see Section A.II. Performance) will be described.

I. Concepts

The FMC diagram of FIG. 1 illustrates a example architecture of this embodiment. This embodiment is a computer system 100 according to the invention, comprising an in-memory database (IMDB) as database 108 and a cache controller 106. In the following sections, the different parts and aspects of this architecture and how they work together will be explained.

(1) Application Transparency:

The caching mechanism according to an advantageous embodiment is implemented on the database layer that is transparent to the application layer. In current enterprise applications, such as SAP Financials, the caching logic is implemented in the application layer by using dedicated sum tables that contain aggregated values. Applications may, however, not get notified if data changes, which may lead to latent invalid cache results. Further, many applications working on the same data sets create independent caches which increases data redundancy and application complexity.

(2) Main-Delta Architecture Awareness:

According to an advantageous embodiment, the computer system 100 comprises a columnar in-memory database 108 with two data structures: a main store 116 and a differential buffer 114, where the latter is also referred to as "delta storage". The delta storage 114 holds recently added or updated data, preferably in an uncompressed form. A merge operation is triggered from time to time to move the data from the delta 114 to the main storage 116. All data in the main store 116 is highly compressed and optimized for read queries. Typically, the size of the delta 114 is smaller than the main 116 by an order of a couple of magnitudes. The computer system according to the example embodiment can make use of this by building cached results from the main storage 116 and combining them with information stored in the delta storage 114.

(3) Up-to-Date Result:

An advantageous embodiment always provides correct results based on the most recent data. As there are mixed workloads that contain inserts, this embodiment is able to identify if inserted records invalidate certain cache results.

(4) Insert Only:

According to an advantageous embodiment, entries are only created and never changed. If a value is changed or modified, the difference of the altered value compared to the original value is recorded via an insertion of a new transaction record into the differential buffer (=delta storage) 114.

(5) De-normalized Database Schema:

Join operations are very expensive. With increasing hardware capabilities and efficient compression techniques, it becomes feasible to work with de-normalized data schemes that store duplicate and dependent information in one table, but do not need to perform joins. According to an advantageous embodiment, all information is stored in a flat de-normalized one-table schema.

(6) Limited Amount of Aggregation Operators:

Aggregation functions can be divided into three categories: distributive, algebraic and holistic functions. Distributive functions, such as sum, min, max or count, allow partitioning of the data in to n sets for which n aggregated values are stored. The overall result can then be derived by applying the function again on the partitioned results. An algebraic function can be computed by combining a constant number of distributive functions. E.g. AVG=SUM/COUNT. Holistic functions such as mean cannot be calculated by a constant number of distributed functions. An advantageous embodiment can at least cope with distributive aggregation functions because they are the most relevant aggregation functions in analytical applications.

(7) Cache Controller:

In an advantageous embodiment, the cache controller 106 is implemented as a proxy that operates between a potential database client 102 and the actual database system 108. This allows for handling the in-memory database 108 in a black-box-like fashion, i.e., an existing database solution can be updated by simply arranging the cache controller 106 between the existing database 108 and the client(s) 102. Because the proxy 106 mimics the database's application programming interfaces (APIs) 104, any client that used to be able to interact with the database, can still behave as before by only using the cache proxy 106 instead. Using this pattern, this embodiment works in an application-transparent way. As an additional benefit, a proxy solution enables the integration of other functionalities that can be used for both an improved caching functionality but also for other purposes. Examples for such use cases are the integration of workload analysis components or data access trackers.

(8) Simple Caching:

In this section, result retrieval is explained. The validity problem will be explained in more detail in the subsequent section. An advantageous embodiment aims to make use of the particularities of the underlying in-memory database architecture 108. This means that the advantages of a main-delta separation are exploited explicitly when caching results for SQL queries. Therefore, the cache controller 106 adds a cache management store (CMT) 110 to the database 108. This table 110 manages existing cache entries and their corresponding states. An advantageous embodiment is intended to cache the results of SQL queries so that these results need to be stored for later usage. The cache controller 106 then manages the CMT 110 and the cache result handling as described in the following: When a client 102 tries to query the database 108 through the cache controller proxy 106, the cache controller 106 hashes the query. Using this computed hash as an identifier for the query, it then looks up the CMT 110 to check:

(a) if a cache entry for the actual query is already existing according to step 202, and (b) if it exists, if it is still valid according to step 212.

If the cache controller 106 does not find an existing cache entry for the corresponding SQL query, it conveys the query without any changes to the underlying database 108 according to step 204. The database 108 will also return the query result back through the proxy 106. The cache 106 will then return the result to the initial client 102 according to step 210 and create a valid cache entry 112 for the SQL query according to step 206. Since in relational databases, the result of a query is always a relation itself, the cache controller 106 saves the result into a new table 112 in the database 108. This table 112 can be seen as the cache 112 value of the SQL query. The name of this new table 112 that acts as a cache entry 112, is the hashed version of the SQL query. This implementation detail can easily be modified.

When the cache controller 106 creates such a new table as a cache entry 112, it inserts a new tuple into the CMT 110 in order to keep a reference to the actual cache entry 112. In case that the cache controller 106 already finds a cache entry 112 for an incoming query according to step 212 andt this value is still valid according to the CMT 110—it can now make use of this cache entry 112 according to step 214. This can be done by changing the original SQL query into a simple SELECT*FROM cache_entry query. The adapted query is then sent to the database 108 which returns the—potentially small—cache entry table instead of performing computing-intensive SELECT operations on the original data. Assuming a valid cache entry 112, the result can be expected to be exactly the same as if the original query would have run on the entire data set.

Because all these cache management operations and potential query manipulations happen in the cache controller 106, a client 102 does not have to care about it. However, it can benefit from the caching solution by getting correct values for potentially complex queries much faster (see Section A.II. Performance).

(9) Cache Invalidation Strategies:

As the caching solution is intended to improve the overall response time for SELECT queries, a cache entry should be used as often as possible. However, since an advantageous embodiment handles OLAP and OLTP workloads on a single system, mixed INSERT and SELECT statements have to be handled appropriately. Such workloads not only include computing-intensive report queries but also INSERT statements that regularly add new data to the system.

These data insertion operations are challenging for a cache solution because the cache has to guarantee the correctness of the returned results based on the latest data. This is not possible if the cache would not consider new tuples entered into the system.

In this Section we will focus on how to mark a cached result invalid and in subsequent section we will explain how to revalidate the cached result sets.

According to a naive solution for keeping cached results up to date, the cache is cleared after each INSERT statement. However, this solution would make it hard to finally make use of the cache since—even in workloads where e.g. only every 10th query was an INSERT—the entire cache would mostly be destroyed before it could be really exploited. For mixed workloads in large enterprise systems, such a ratio between SELECT and INSERT statements is not unusual.

Figure 2:
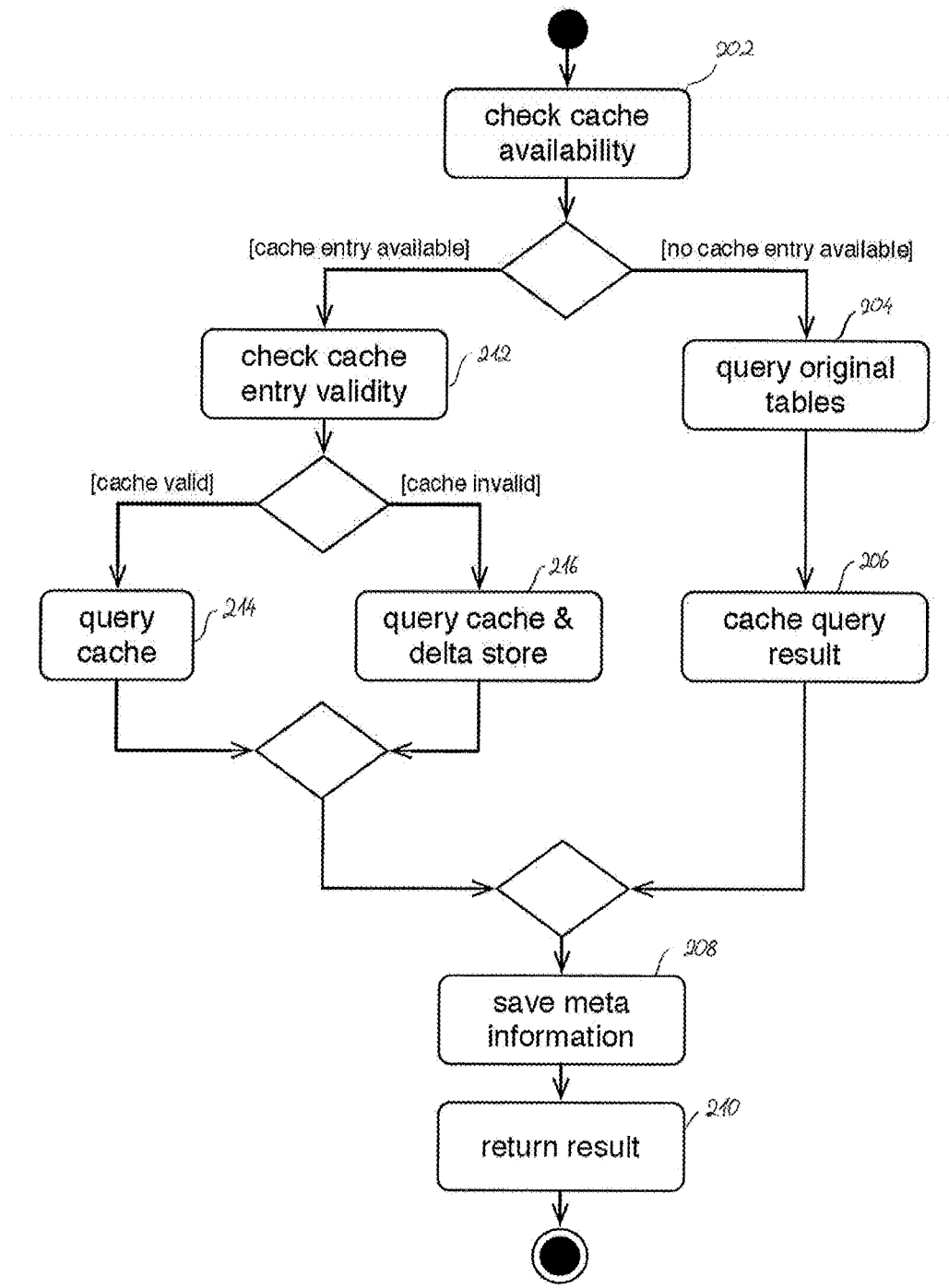
FIG. 2 shows the caching strategy implemented in the computer system shown in FIG. 1 as a unified modeling language (UML) activity diagram.

To overcome this problem, this embodiment combines two approaches to make the cache handling and especially the case of cache invalidations for inserted tuples smarter. Both approaches extensively make use of the main-delta architecture of the underlying in-memory database and will be explained with reference to the UML activity diagram shown in FIG. 2.

The first advantageous approach is to not invalidate all cached queries when a new tuple is entered into the database. It is likely that an INSERT query does not affect the results of all cached query results 112. To find out the affected queries, this embodiment makes use of the fact that inserted values are at first stored in the database's delta store 114. The cache controller 106 lets the cached queries then run only against those records of the table that are stored in the delta store 114. For each query, it checks if it returned a non-empty result. If this is the case, then a performed INSERT query has obviously affected the corresponding cached SELECT query. It has then to be invalidated.

The second advantageous approach tackles the question of how to handle these invalid cached query results. A naive solution would be to delete the corresponding cache entry and to rebuild it, if necessary. Instead, the cache controller 106 of this embodiment only marks the affected cached results as invalid in the CMT 110. When the cache controller 106 now processes a SELECT query that has already been cached but invalidated due to inserted tuples that affected the result of this query, it adapts the original query to use the cache result table 112 instead, including the potential changes that the INSERT statements have introduced. This is done by 216 querying the delta store 114 explicitly. Thus, the replacement query makes use of the available (but invalid) cache 112 and the delta 114 to derive a combined result. Since the cache controller 106 now considers the cached results as well as the new tuples from the delta 114, the combined result is valid and up-to-date. Note that this method works directly only for distributive aggregation functions. To illustrate this limitation, the result for a distributive function like SUM can be created by building again the SUM of the cache entry and the delta values. In contrast, an algebraic function like AVG is not directly computable for the combination of cache and delta because the original count of tuples that built up the cached result is not available in the cache any more. However, AVG can nevertheless be calculated by maintaining corresponding distributive functions SUM and COUNT.

(10) Cache Revalidation Strategies:

Using the described method to query invalid cache entries and the delta storage as outlined in the previous section yields correct results. Nevertheless, it is advantageous when the delta 114 contains a small amount of tuples compared to the main store 116. Since the delta store 114 does not make use of the compression optimizations of the main store 116, it does not perform as well for large amounts of data. Additionally, using both—cached results 112 and the delta store 114—will lead to constantly growing overhead due to the delta store 114 querying if constant INSERT statements invalidate more and more cached results. In order to "clear" the delta, modern in-memory databases are configured for carrying out a merge process which moves the inserted entries from the delta 114 into the highly read-optimized main store 116. The caching solution according to the embodiment hooks into this process for cache revalidation: the invalid cache entries 112 are revalidated when a database merge happens. According to the embodiment, not the entire cache results for the affected cached queries are recomputed but instead an incremental cache update mechanism is employed. This mechanism works like the described ad-hoc query resolution strategy, described in the previous Section. Thus, according to the incremental cache update, updating the cache requires only combining the result of the old cache result with the changes calculated by running the corresponding query against those records of the table that are stored in the delta store 114. After having finished this merge and cache update procedure, the delta store 114 is empty and all cache entries 112 are valid again.

(11) Hot and Cold Data Analysis:

According to an advantageous embodiment, the underlying database 108 is a column-store database having a value dictionary for every column, like SAP's HANA. According to this embodiment, read and write frequencies of attribute values are analyzed by tracking the dictionary accesses. When a value is inserted into or read from a table, at least one dictionary access per column is necessary. According to this embodiment, exactly these accesses are tracked in order to find column values which are read frequently but written rarely. SELECT queries and subqueries which run frequently and filter on exactly these values are perfect candidates for caching, because their result is hardly ever invalidated by new inserts. The following examples illustrate this approach: In an example table one of the columns on which the SELECT queries filter is the business year. Most of the SELECT and INSERT queries work on the current business year, so that the read and write count on this value is high. However, a significant amount of recurring SELECT queries and subqueries filter on the previous business year to compare values between the current and previous business years. Modifications of tuples or tuple inserts which have the previous business year set are rare. Queries on the previous year are therefore perfect candidates for caching. Another attribute on which most of the select queries from the example workload filter is the company code. This attribute is not as suitable as the business year to find attribute values which are frequently read but hardly modified. The reason is that the company codes are reused over and over again in new business transactions.

(12) Admission Policy:

The longer a BI application exists, the more unique queries will be executed on the database, as the number of reports in the application may grow. New categories, countries or regions may be introduced to the data set, extending the ranges of WHERE clauses in the predefined reports. As a new year passes by, all reports will be executed for this new year, which may double the number of unique queries every year. It is therefore important to filter for good caching candidates. A main issue is that the query has not been executed by the time one has to decide whether one wants to add it to the cache. One approach of this would be to predict the query execution time and query result set size using techniques known in the prior art. Queries that have a high execution time are good caching candidates because the amount of execution time saved every time the query gets executed again is high. This, however, depends on the cached result set size. Imagine a long running query that has a compression rate of 10%. This means the size of the result set is 90% of the size of the original data set in the main storage. When the cache is invalidated by an insert statement, one has to answer the query by applying it to the delta and the cached result set. Since this set is almost as big as the main storage, the amount of time save won't be very high. Based on the given cache size, one could also only save few results sets. Best candidates for caching are therefore queries that are predicted to be long running and return a small result set. According to an advantageous embodiment, there is an analytics engine in the cache controller that is configured for identifying "hot" and "cold" data, i.e. data which is often or only rarely accessed via the SQL query itself. In an advantageous embodiment, such an analysis component that is able to statically derive the affected tables, columns, and values of a workload is implemented. Preferably, this analytics engine is based on machine-learning approaches that, for example, enable an additional mechanism of prefetching probably-required data. Good caching candidates are queries that address data areas that are commonly read and but not often written to. Those could be identified by e.g. limiting the query to a certain year in the WHERE clause.

II. Performance

Concepts of the above presented caching mechanism have been implemented on SAP HANA, short for 'High Performance Analytic Appliance', which is an in-memory, column-oriented, relational database management system developed and marketed by SAP AG. In the following, the performance thereof is compared to an existing caching mechanism as well as to not using a cache at all. The impact of the read-write ratio and versatility of the workload on execution time is evaluated. A criterion for deciding when to merge the delta 114 into the main storage 116 is presented and benchmarked. Lastly, the performance of different strategies for invalidating cached results is evaluated.

Figure 3:
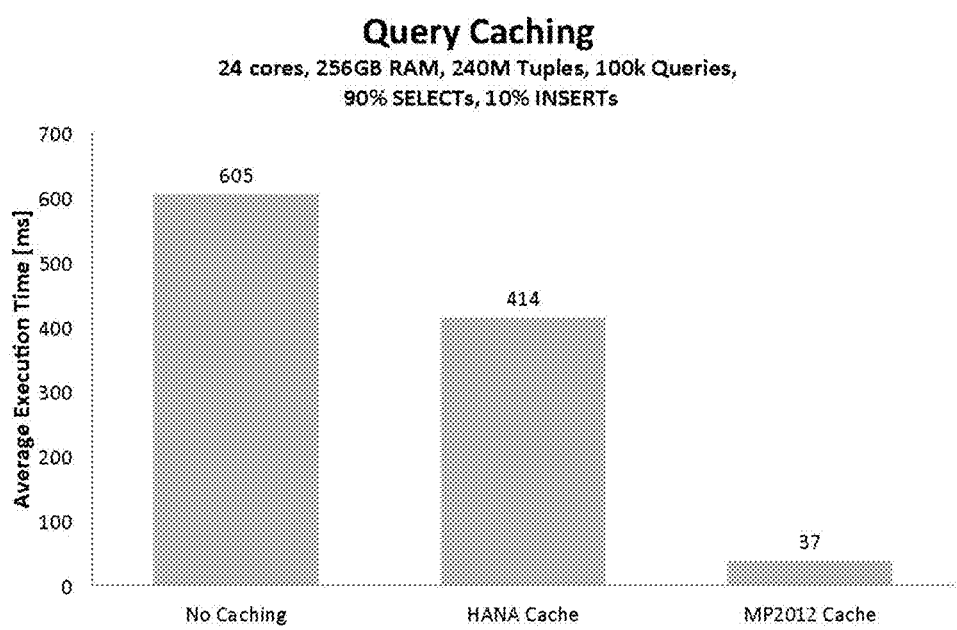
FIG. 3 shows the performance of the implemented caching strategy in comparison with a prior art caching strategy implemented on a conventional HANA computer system and in comparison with no caching at all.

(1) Comparison to Existing Cache and No Caching:

HANA's in-memory computing engine comes with a result cache built into the index server. The cache is deactivated by default and can be parameterized by a maximum cache size and a minimum execution time for queries that should be cached. The result cache stores complete query results and throws them away whenever an insert affects a table for which a result is cached. The performance of the implementation of the embodiment is compared to the existing result cache as well as to no caching at all. A workload of 100,000 queries with a read-write ratio of 9:1 is used. The benchmark was performed on the 24 core machine. The results are pictured in FIG. 3. The existing cache achieves a speedup of approximately 30% compared to using no cache at all. Since each and every insert into the de-normalized one-table schema causes an invalidation of all cached results, the performance gain is not as significant. The above described cache controller 106 according to the invention does not query the large main storage 116 even if new values are being inserted and therefore outperforms the existing cache by a factor of 10. Compared to using no caching at all, which is the default in most existing applications, the speedup is a factor 16.

Figure 4:
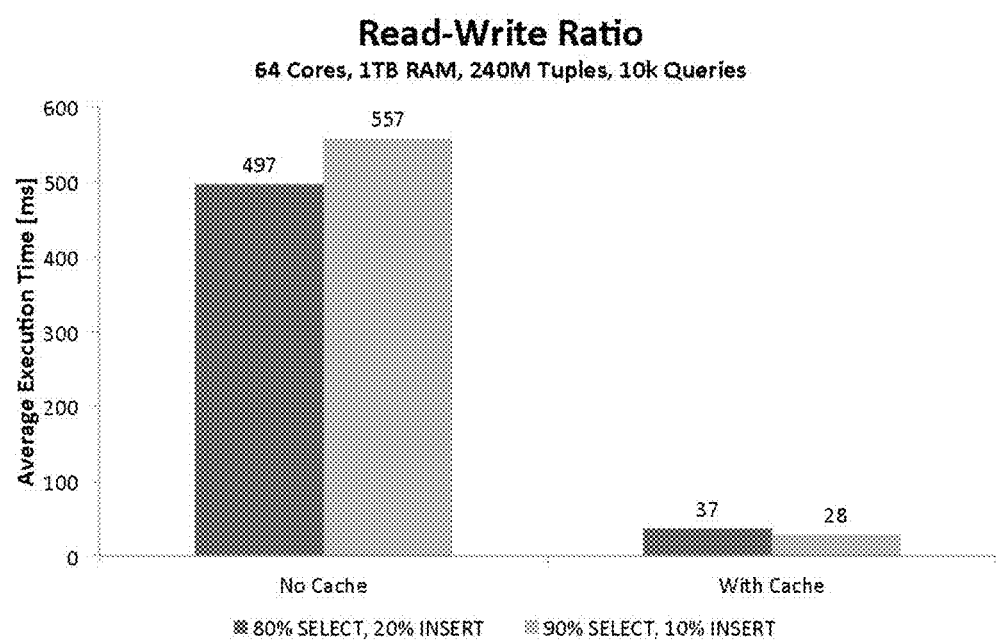
FIG. 4 shows the performance of the implemented caching strategy in comparison to no caching for workloads with different read-write ratios.

(2) Read-Write Ratio:

The read-write ratio highly affects the performance of the above described caching mechanism. The runtime of the cache according to the embodiment is compared to no caching for a ten thousand query workload with a read-write ratio of 9:1 and a ratio of 8:1 on the 64 core machine. The results are shown in FIG. 4. If no caching is used, the more write intense workload performs approximately 10% better than the other workload. This is because the write operations are only atomic inserts that are executed in almost no time. With an increased percentage of write operations there are less long running read queries which leads to the decrease in execution time. In the caching case however, a write operation causes the overhead of invalidating views and increases the probability of invalid cache results. Therefore, an increase in execution time for the more write intense workload by approximately 30% is observed. Even with a higher amount of write operations our caching mechanism still outperforms applications with no caching by a factor 13. As told by experts from SAP, most of their BI applications are very read intensive with a share of 90% or more read operations.

Figure 5:
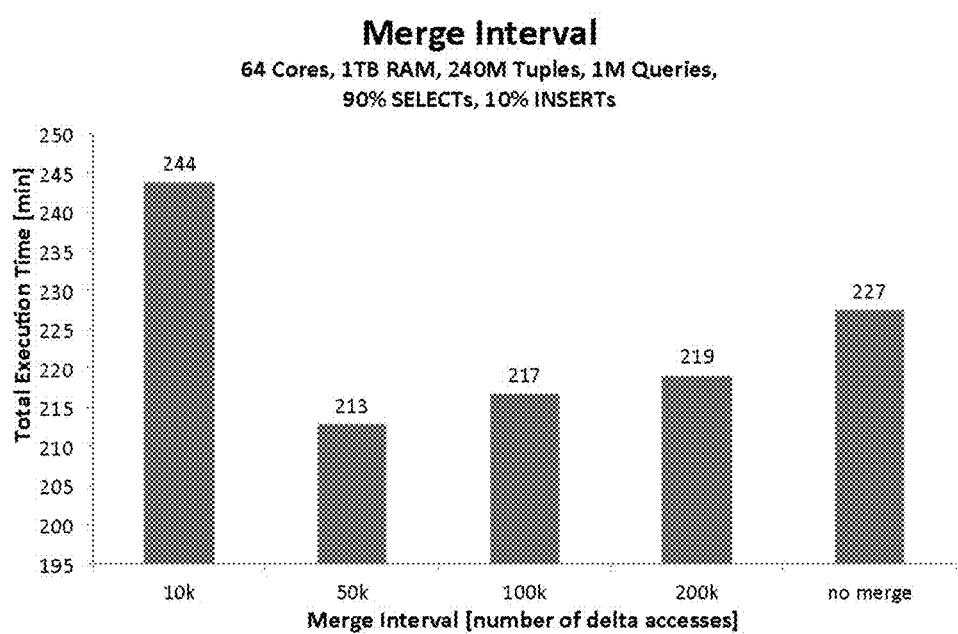
FIG. 5 shows the performance of the implemented caching strategy for different merge intervals based on the number of delta accesses, which is the number of access to the differential buffer.

(3) Merge Interval:

Invalid cache results 112 are revalidated when the delta storage 114 is merged into the main storage 116. Traditionally the merge is triggered if either a certain time interval is exceeded or the size of the delta is big compared to the available heap space. For the caching algorithm according to the embodiment, it is also important how many cache results are invalid, that is, how often the delta has to be accessed for answering read queries. For each invalid cached result 112, an up-to-date result is retrieved by combining the stored result in our cache 112 with the result of the query applied to the delta storage 114. This takes longer than solely retrieving the result from cache 114. Therefore each delta access looses a certain amount of time compared to a valid cache hit. If this accumulated loss of time is bigger than the time it takes the database 108 to perform a merge, it is advisable to merge. According to an advantageous embodiment, the traditional merge criteria are deactivate and merge is performed based on the number of delta accesses. Performance of this new criterion is evaluated for different thresholds. The results are shown in FIG. 5. Note that for this experiment the total execution time is shown, since the time needed for the merge we must be included. This benchmark was executed on the 64 core machine with a one million query workload containing 100,000 thousand INSERT statements. When merging after a small number of delta accesses the highest total execution time is observed. This is because the merge is performed way too often. Each merge takes time: the resulting increase in pure cache hits is not justified by the merge overhead. However, if one does not merge at all the accumulated overhead of the delta accesses outruns the time needed for the merge. A local minimum in total execution time is observed somewhere around 50 thousand delta accesses, that is, after approximately five thousand new inserts. Taking the number of delta accesses as a merge criterion apparently influences the execution time. Therefore, according to an advantageous embodiment, the amount of delta accesses is considered for defining an optimal merge decision.

Figure 6:
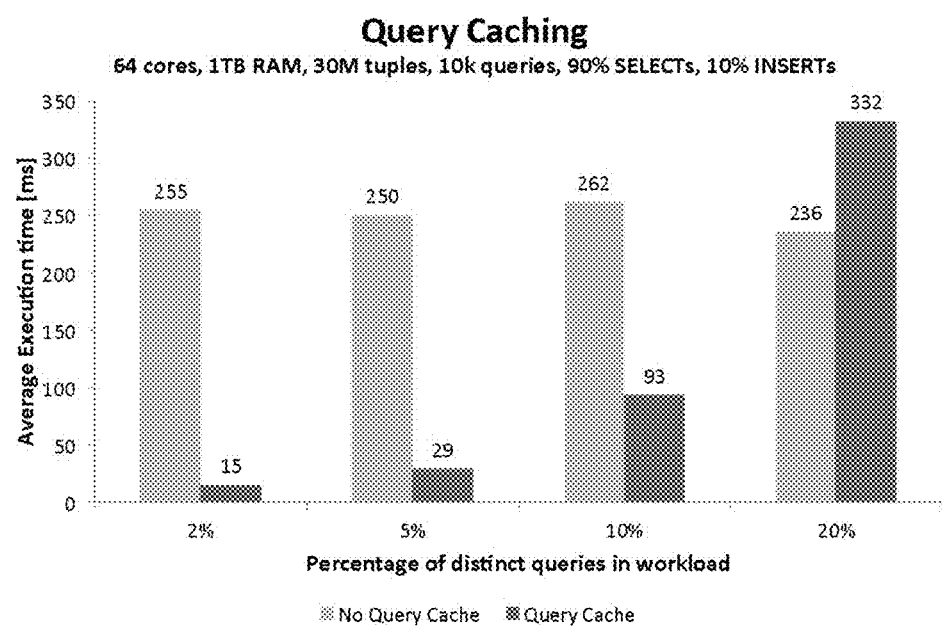
FIG. 6 shows the performance of the implemented caching strategy for different amounts of unique queries in the given workload compared to using no cache.

(4) Share of Distinct Queries:

The strength of a caching mechanism is to answer reoccurring queries. The number of times a query reoccurs is dependent on the number of distinct queries that has been used to create the workload for our benchmark. In another experiment, the share of distinct queries is changed and the average execution time per query compared to using no cache is observed. The results are shown in FIG. 6. The number of distinct queries has no effect on the performance when using no cache since all results are always recomputed. However, one sees that for caching the average execution time grows more than linearly with increasing percentage of distinct queries (note non-linear xaxis scale). If the percentage of unique queries doubles, query results can be reduced only half as often. This also lowers the benefit of caching the query. Additionally the added unique queries have to be computed. With a growing number of unique queries the overhead of maintaining the cache also grows. Query results need to be initially persisted, kept up to date during the merge process and managed within the CMT 110. This leads to the observed super linear growth. If the percentage of unique queries is 20% or higher not using a cache is even faster than the above described caching mechanism according to the invention. In this implementation, the cache size is not limited and all queries are cached. In practice, long-living applications will generate a large number of unique queries. It is therefore crucial to put an admission policy in place that filters good caching candidates. According to an advantageous embodiment, a garbage collection for existing cache lines is implemented so that the cache size does not grow substantially over time.

Figure 7:
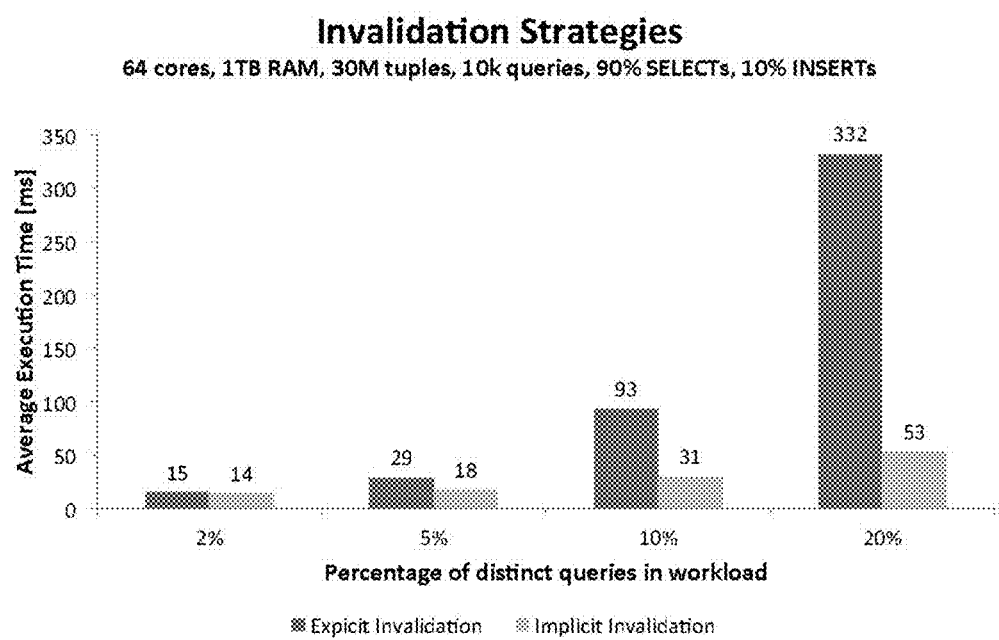
FIG. 7 shows a comparison of an implicit and an explicit cache invalidation strategy for different ratios of distinct queries in the workload.

(5) Invalidation Strategies:

Caching might not be profitable if there is a high number of distinct queries. This overhead is due to the implemented explicit invalidation strategy that checks cache lines 112 for validity on each insert. For each valid cache entry 112, the query that belongs to the entry is re-executed only on the delta 114 to see if the result is empty, meaning that the cache entry 112 is still valid. With a high number of cache entries 112 this overhead grows significantly. Another invalidation strategy would be to implicitly assume that all cache lines 112 are invalid by default and always return the result from cache 112 and delta 114 combined. As long as the delta 114 is kept considerably small the overhead of cache 112 and delta 114 compared to cache 112 only is small. In some cases, the time saved by omitting explicit invalidation is bigger than the overhead of always accessing the delta storage 114. We refer to this strategy as implicit invalidation. This strategy was implemented and its performance was compared to explicit invalidation. The results are shown in FIG. 7. One sees that for workloads with many repeating queries the performance of the two strategies is roughly the same. However, as the number if distinct queries increase, one observes a sub-linear growth in average execution time for implicit invalidation opposed to the super-linear growth for explicit invalidation. The workload inserts 1000 tuples into the delta in total, which makes the overhead of accessing the delta storage 114 negligible. In the workload that was derived for our scenario, the percentage of distinct queries was 0.8%. The two strategies do not show a performance difference in this case. According to an advantageous embodiment, implicit invalidation is used because it outperforms no caching even at a percentage of distinct queries where the explicit strategy is slower than not using a cache (cf. FIG. 6).

Figure 8:
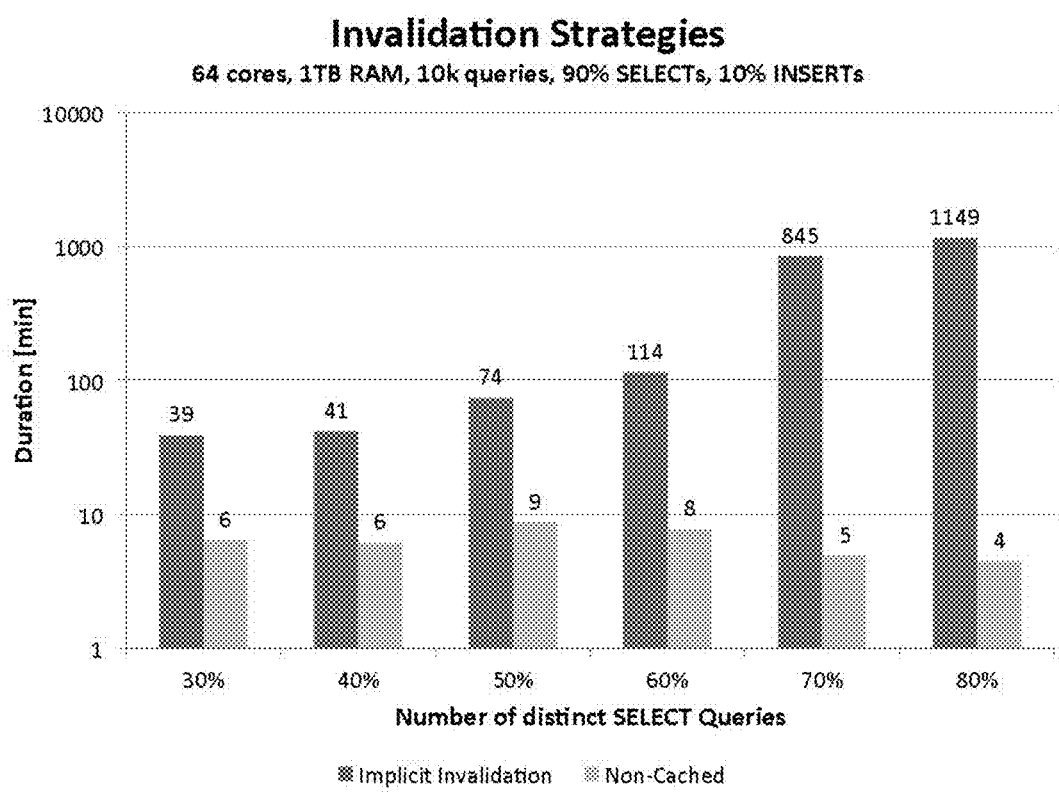
FIG. 8 shows the overhead generated when caching using the implicit invalidation strategy compared to the overhead generated without caching.

(6) General Caching Overhead:

To quantify the general overhead induced by caching according to the embodiment, the runtime thereof is compared to no caching when the distinctiveness of the queries inclines to 100% (cf. FIG. 8). Only caching with an implicit invalidation strategy is examined because it already outperformed the other approach. For many distinct queries, caching costs an overhead by many magnitudes. Note that the logarithmic scaling on the y-axis. Hence, a pre-examination of the expected workload is recommended before using this cache.

B.

Cache Maintenance Component

According to an advantageous embodiment, the cache controller 106 implements a cache maintenance strategy for updating the cached result. In the following, different cache maintenance strategies are evaluated in the context of the columnar in-memory database 108, in particular, a cache maintenance strategy that takes the main/delta-architecture and the merge process of columnar storage into account. The performance of these cache maintenance strategies are evaluated using a new cost model which determines the best cache maintenance strategy given a specific workload and using benchmarks applied to an available-to-promise (ATP) application.

I. Cache Maintenance Strategies

Herein, cache maintenance strategies are distinguished according to their maintenance timing: Eager strategies immediately propagate each change of base tables to affected views. Lazy strategies maintain materialized views at the time the view is queried. Independently of their maintenance timing, one can divide maintenance strategies in full and incremental ones. Full strategies maintain the aggregate by complete recalculation using its base tables, wherein base tables are forming the basis of the aggregate. Incremental strategies store recent modifications of base tables and use them to maintain the views. The preferred merge update strategy is takes into account and takes advantage of the in-memory column table architecture that divides column tables in read optimized main stores 116 and write optimized delta stores 114. The merge update strategy calculates the materialized aggregate as snapshot at merge time. In detail:

(1) No Materialization

According to the no materialization (NoMat) strategy, aggregates are always calculated on-the-fly with this strategy. The aggregate is represented by a standard view and maintenance is therefore not necessary at all.

(2) Eager Full Update

The eager full update (EFU) strategy maintains the aggregate when a write to the base table occurs. Reads of the materialized aggregate can therefore be answered without further maintenance. After a new record is inserted in the base table, one determines the affected row in the materialized aggregate table. If there is an affected row, its value is updated by recalculating the value from all rows (including the newly inserted one) from the base table. If there is no affected row, a new row in the materialized aggregate table is inserted.

(3) Eager Incremental Update

The eager incremental update (EIU) strategy immediately maintains the materialized sum for each single insert. Therefore, there is no maintenance needed while processing a read to the materialized aggregate. To maintain the sum as a consequence of an insert, we have to differentiate between two cases: the new record has an already existing combination of grouping attribute values or a new one. In the first case, one has to update, i.e. add up, the old aggregated sum with the value of the new record. Otherwise, one has to insert a new aggregate value into the materialized view with the new combination of grouping attribute values.

(4) Lazy Incremental Update

Using the lazy incremental update (LIU) strategy, the maintenance is done when reading the aggregated sum. Hence, after processing a select, the requested aggregate is up-to-date. In order to be able to maintain the sum during the select, one has to store the changes caused by inserts since the last maintenance point. This is done by a dictionary structure which stores how the aggregate has to be updated (values) for each combination of grouping attribute values (keys). When processing a select, one has to maintain the materialized view with the stored correction aggregates from the dictionary. Incremental maintenance strategies work independently of the merge process.

(5) Smart Lazy Incremental Update

The smart lazy incremental update (SLIU) is an extension of the lazy incremental update strategy. Again, changes introduced to the base table are batched in an additional structure. Upon a read to the materialized aggregate, the where-clause of the query is evaluated and only rows that are part of the result set are maintained using the values from the additional structure. This strategy is different from the lazy incremental update in that rows from the materialized aggregate that are never read, are also not maintained.

(6) Merge Update

The merge update (MU) strategy for summation is best explained using an example. Starting point is a merged base table shown in Table Ia of FIG. 9 using the known schema. A merged base table implies a consistent materialized view table (cf. Table Ib of FIG. 9). Following inserts are not propagated to the view table, but show up in the delta 114 of the base table. When inserting new records to the base table, the materialized view table does not change. Instead it becomes stale. A snapshot of the base table after three inserts can be seen in Table II of FIG. 9. Upon selecting from the materialized aggregate, the current fresh sum has be calculated by combining the stale view, which is the aggregated main store 116 (cf. Table IIIa of FIG. 9), and the aggregated delta 114 of the base table, which contains all changes done to the base table since the last maintenance point (cf. Table IIIb of FIG. 9). The combined aggregate is shown in Table IIIc of FIG. 9.

II. Influencing Factors

The last section presented various materialized view maintenance strategies, differing in the way when and how they update materialized view tables. This yields different performances of each strategy under certain workloads. This section relates to the issue of choosing a good strategy by presenting performance influencing factors. Thereby, it is distinguished between workload dependent characteristics and factors depending on table properties and settings. For each factor, it is described why and how they influence the maintenance costs.

(1) Workload Characteristics

Workload characteristics describe the distribution of query types, timing, and properties during a specified time frame. As on the focus lies on insert-only databases, it is differentiated between two query types: inserts (i.e. writes) and selects (i.e. reads). Processing different query types demands different strategies to trigger the maintenance process. For eager strategies, selects against those records of the table that are stored in the view do not require maintenance. That is why eagerly maintaining strategies perform well on read-dominant workloads. On the other hand, lazy strategies benefit from many inserts. They can summarize them to a single maintenance step. Thereby, the timing and especially ordering of queries is important. Given a select-insert ratio of 0.5 (e.g. four selects and inserts each), the query types could alternate (e.g. insert, select, insert, select, . . . ) or be ordered (e.g. insert, insert, . . . , select, select, . . . ). Alternating query types require lazy strategies to maintain the view for each select. In contrast, lazy strategies can combine the maintenance of all successive inserts while processing the first select, when queries are ordered by type. The combination of inserts in a single maintenance step is especially good for inserts having the same grouping attribute values. In this case the inserts affect the same aggregate record in the materialized view, so that only one value has to be changed.

(2) Table Properties and Merge Frequency

Table properties include data metrics of tables and materialized views. The size of the base table is an influencing performance factor. First, it helps to decide whether to materialize or not. Materialized aggregates are especially useful for big, often-read tables. Second, the base table size also influences the performance of strategies. Base table access (reads) becomes increasingly expensive with a growing table size. Strategies for views having big base tables should therefore avoid or reduce the access of base tables during the maintenance process. Incremental strategies try to achieve this at the costs of more complex maintenance logic. The granularity of grouping attributes is another influencing factor. A finer granularity of grouping attributes values implies more combinations of these values and thus more materialized aggregates. In consequence, the probability that successive inserts have the same grouping attribute values decreases. That is why it is less likely that lazy strategies can combine these inserts. Summing up, lazy strategies benefit from coarser granular grouping attribute values. The merge frequency influences the performance of the merge update strategy. The calculation of the fresh aggregate is fast for a small delta since few records have to be aggregated on the fly. That is why merge update gains performance with a higher merge frequency compared to other strategies. However, merging too often causes high costs compared to the resulting performance improvement of reads. The other maintenance strategies do not depend that strongly on a small delta size as merge update does.

III. Cost Estimator

Figure 10:
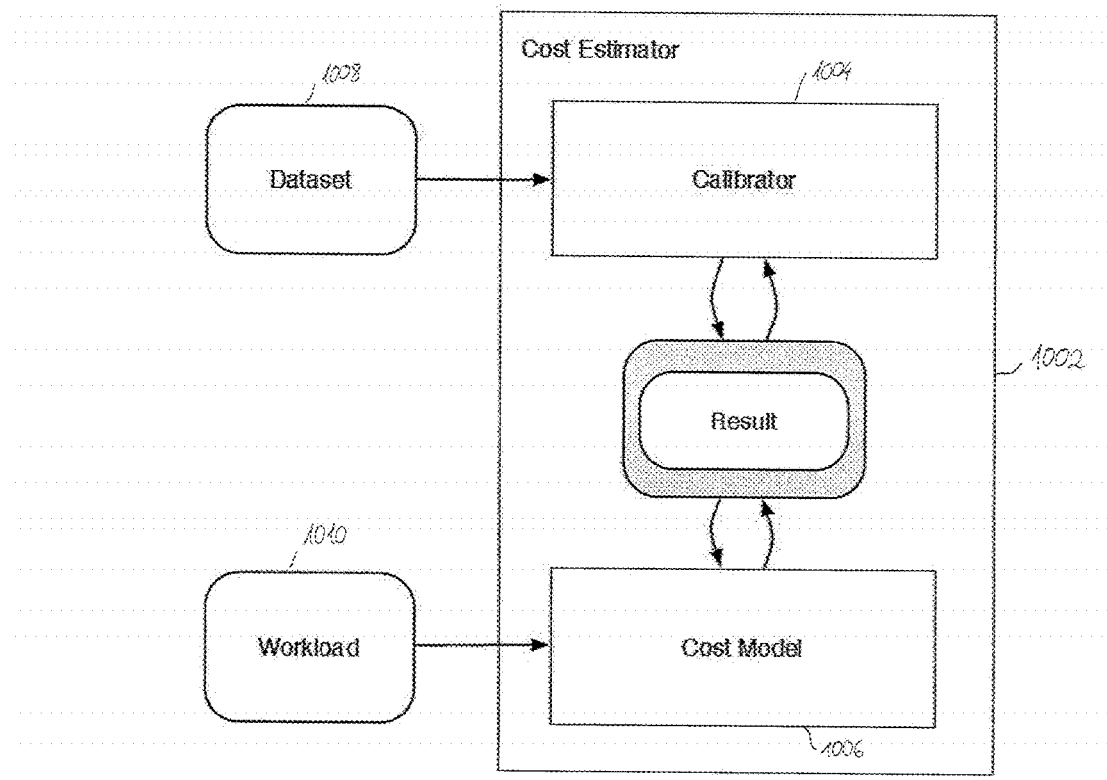
FIG. 10 shows an architecture of a cost estimator comprising a calibrator and cost models.

According to an advantageous embodiment, the cache controller comprises a cost estimator 1002 configured for determining the execution time for a given workload and dataset. The cost estimator 1002 is divided into two parts: a calibrator 1004 and a cost model 1006 (cf. FIG. 10). The calibrator 1004 is responsible to measure database-specific execution times for certain types of queries. The cost model 1006 consists of cost functions for the read and maintenance operations of a strategy. Additionally, the cost functions consider the different parameters as explained in Section B.II. This section relates to a detailed cost model 1006 for the evaluated strategies. Due to the fact that write operations on base tables create the same costs for all strategies, these costs are excluded from the cost model. Therefore, it is only focused on read and maintenance costs.

(1) Calibrator

The performance of a database depends on two parameters: (i) Hardware: It is distinguished between high-end servers with several terabyte of main memory and many cores or medium servers with gigabytes of main memory and fewer cores. (ii) Data set: The dataset characteristics can vary in size and schema.

For that reason, a calibrator 1004 may be used to take these parameters into account. The calibrator 1004 measures the performance of a database 108 with its underlying hardware and a given dataset. The tool measures the execution time of basic operations. The required operations are retrieved from the cost model defined for each strategy. A basic operation can be a select query to retrieve data from the materialized aggregate table or a write operation into the materialized aggregate table. Having collected the costs for basic operations, the cost estimator 1002 is able to make estimations independent of the environment.

(2) Cost Model

The cost model 1006 consists of a number of cost functions for each strategy. A cost function defines the maintenance costs which are created for reads and writes into the base table. As explained in Section I, each strategy has a different timing of maintenance and requires different maintenance steps. Additionally, some strategies are more affected by certain factors than others. Therefore, each strategy has different cost functions based on that. Following, the cost models are explained in detail using the following symbols: $N_r$=Number of reads; $N_w$=Number of writes; $N_{wk}$=Number of distinct writes occurring between two reads k−1 and k; $N_m$=Number of merge operations on the base table; $T_{RA}$=Time for a read in the materialized aggregate table; $T_W$=Time for a write into the materialized aggregate table; $T_{RDk}$=Time for an on the fly aggregation in the delta table for the kth read; $T_r$=Time for a single read; $T_{rk}$=Time for the kth read; $T_w$=Time for a single write; $T_m$=Maintenance time during a merge operation; $T_M$=Execution time for a merge operation; $T_{total}$=Execution time of a workload (a) Eager Incremental Update (EIU):

The cost model for the eager incremental update strategy consists of two functions. The first function (i) defines the costs $T_r$ for a single read which is requesting the materialized aggregate.

$$T_r = T_{RA} \quad \text{(i)}$$

The second function (ii) defines the costs $T_W$ for a single write into the base table of the materialized aggregate. Since it is an incremental strategy, the costs consist of the read time $T_{RA}$ to retrieve the old value and the write time $T_W$ for the new value into the materialized aggregate table.

$$T_W = T_{RA} + T_W \quad \text{(ii)}$$

Function (iii) shows the total execution time for the eager incremental update strategy. Both parameters show linear growth based on the number of reads Nr respectively the number of writes $N_w$. The strategy is not influenced by other factors.

$$T_{total} = N_r * T_r + N_W * T_W \quad \text{(iii)}$$

(b) Lazy Incremental Update (LIU):

The cost model for the lazy incremental update strategy consists of only one function. For lazy approaches, all maintenance is done on a read. Function (iv) defines the costs for a single read which is requesting a materialized aggregate. In this case, read and maintenance costs are combined into one function. On the one hand, the maintenance costs depend on the number of distinct writes per read $N_{wk}$ (cf. Section B.II). On the other hand, the costs $T_{RA}$ for a single read are equally to the eager strategy. $N_{wk}$ is influenced by two parameters, the order of the queries in a workload and the distribution of data. Both values have to be retrieved from the workload.

$$T_{rk}=N_{wk}*(T_{RA}+T_W)+T_{RA} \quad (iv)$$

Due to the fact that the LIU does all the maintenance on read operations, there are no maintenance costs for write operations (v).

$$T_W=0 \quad (v)$$

Function (vi) shows the total execution time for the lazy incremental update strategy. The time only depends on the number of read operations.

$$T_{total}=\Sigma_{k=1}^{N_r} T_{rk} \quad (vi)$$

(c) Merge Update (MU):

The cost model for the merge update strategy differs from the other strategies. In case of a read, the costs depend on the performance of the on the fly aggregation on the delta table where $T_{RDk}$ defines the costs for the aggregation for the kth read.

$$T_{rk}=T_{RA}+T_{RDk} \quad (vii)$$

A write operation—equally to the lazy strategy—creates no maintenance costs.

$$T_w=0 \quad (viii)$$

Contrary to other strategies, the merge update strategy updates its materialized aggregate table during a merge event. Therefore, the values of the delta table are used. The created maintenance costs equal the costs for a single read $T_{RA}+T_{RDk}$ extended by a single write $T_W$ on the materialized aggregate table.

$$T_m=T_{RA}+T_{RDk}+T_W \quad (ix)$$

The total execution time is calculated based on the time for reads and the merge. The merge time Tm depends on the number of merge operations Nm performed during the execution.

$$T_{total}=N_m*T_m+\Sigma_{k=1}^{N_r} T_{rk} \quad (x)$$

(3) Workload Characteristics

Additional to the data set characteristics that are considered by the calibrator, the estimator requires information about workload characteristics 1010. These characteristics can be provided by the user in form of parameters or retrieved from a given workload performing an analysis based on the factors explained in Section B.II.

IV. Benchmarks

In addition to the cost model 1006, benchmarks were run to evaluate the performance of different strategies under varying workloads 1010. This section opens with a brief explanation of the architecture for a prototype and the general setup of the benchmarks, before presenting the findings gathered from the benchmark runs.

Basis of the benchmark is a simplified scenario from an ATP application because it provides a mixed workload with resource-intensive aggregations. The OLTP-style queries model the movement of goods in a warehouse whereas the OLAP-style queries aggregate over the product movements to determine the earliest possible delivery data for requested goods by a customer. ATP relies on a single, denormalized database table called Facts that contains all product movements. Every movement consists of a unique id, the date, the id of the product being moved, and the amount. The amount is positive if goods are put in the warehouse and negative if goods are removed from the warehouse. The materialized aggregate based on this table is called Aggregates. The aggregate groups the good movements by date and product and sums up the total amount per product and date.

(1) Architecture

Figure 11:
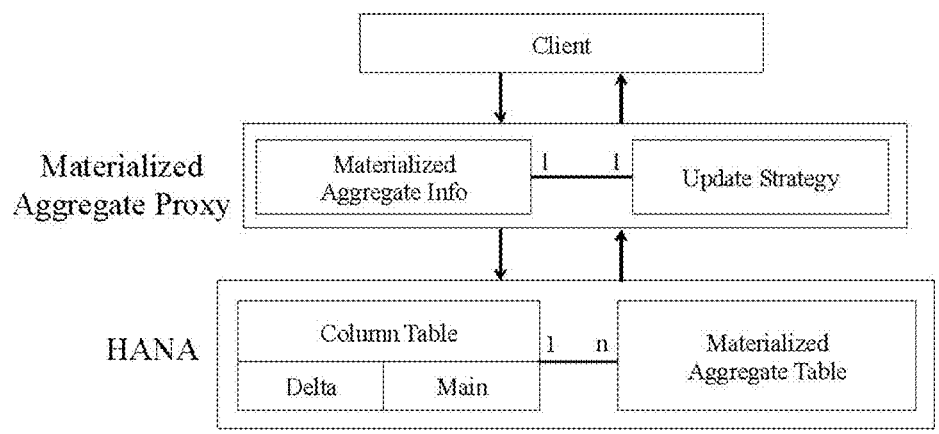
FIG. 11 shows an architecture of a computer system according to the invention that comprises the cost estimator of FIG. 10.

The above presented strategies (cf. Section B.I) were implemented in order to measure their performance using SAP HANA. SAP HANA is an in-memory database 108 that can store records using a row- or column-layout. In this setup, all the tables are column tables in order to leverage the delta-main architecture for the proposed merge update strategy. The strategies were prototyped using the proxy architecture presented in FIG. 11. The client 102 sends queries to a cache controller 106 in the form of a materialized aggregate proxy which implements the maintenance logic. The proxy 106 analyzes queries and forwards them with additional maintenance queries to the DBMS. Finally, the result is returned to the client 102. To be able to decide when and how to send maintenance queries to the database 108, the proxy may store meta information about the created materialized aggregate and its used maintenance strategies according to step 208.

(2) Setup

All benchmarks were carried out on a server featuring 8 CPUs (Intel Xeon E5450) with 3 GHz and 12 MB cache each. The entire machine comprised 64 GB of main memory. The database used to run these benchmarks on is SAP HANA version 1.50. Since measured run times can vary between different runs of the same benchmark, every benchmark in this section was run at least three times—The displayed results are the median of all runs.

(3) Eager Full Versus Incremental Update Strategy

Figure 12:
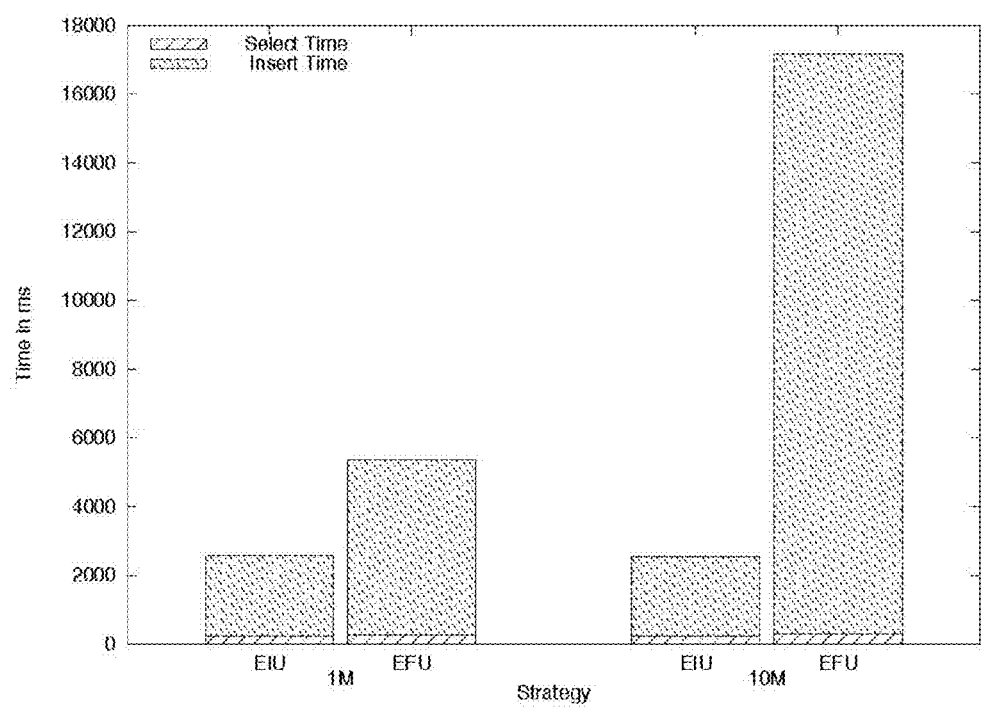
FIG. 12 shows a comparison of results obtained from benchmarks conducted using an eager full update strategy and an eager incremental update strategy for 1 and 10 million records in the base table and a workload of 1000 writes and 100 reads each.

When relations in the base table change, the materialized aggregate has affected rows that need to be updated. In this specific use case, a single write to the base table will affect exactly one row in the materialized aggregate. The affected row can either be entirely recalculated, i.e. deleted and calculated accorded to the creation statement, or it can be updated incrementally according to the changes introduced by the base table modification. For a simple insertion into the base table, the delta introduced by the amount added or removed from the warehouse constitutes a delta that can easily be used to adapt the aggregated value in the materialized aggregate. To measure the effect of an incremental update versus a full update, the following benchmark was used: The base table contains either 1 or 10 million warehouse movements. The workload 1010 used for benchmarking consists of inserting 1000 values in the base table and performing 100 reads against those records of the table that are stored in the materialized aggregate. Since the maintenance is performed in an eager fashion in both instances, the order of the read/write operations has no effect on the total run time. FIG. 12 shows the results of the benchmark. This benchmark shows that in the case of eager maintenance, updating the aggregate in an incremental fashion is beneficial over recalculating the whole aggregate for the affected row. Therefore, the incremental update is preferred whenever aggregates are eagerly maintained. Furthermore, one can see that the read time is the same for both strategies. This is due to the fact that selects only consist of reading values from the materialized aggregate table and do not involve any maintenance operations at all. The maintenance has already been performed during the write operations on the base table. Finally, one can observe that the size of the base table influences the time needed for maintenance in the eager full update strategy but not for the maintenance in the incremental update strategy.

(4) Mixed Workload

A mixed workload consists of OLTP-style as well as OLAPstyle queries. In this case, the workload is comprised of many (950) write operations to the base table, i.e. material movements in the case at hand, and only a few (50) read operations, i.e. selects from the materialized aggregate. For this benchmark a workload was constructed that simulates material movements over the course of a month. The base table has initially 1 million or 10 million records. FIGS. 13a and 13b show the respective results. By comparing FIGS. 13a and 13b we can see that the base table size has an influence on the performance of different strategies. Especially, the relation in run time between different strategies changes, i.e. the most effective strategy depends on the base table size. One can observe that an eager incremental update performs worse than no materialization at all when performed on a base table containing 1 million records. With a base table sized 10 million records this relation is inverted. With both base table sizes the lazy strategies show a superior performance compared to the eager strategies and no materialization at all. Most notably, the merge update strategy is superior in both cases.

(5) Product Distribution

Figure 14:
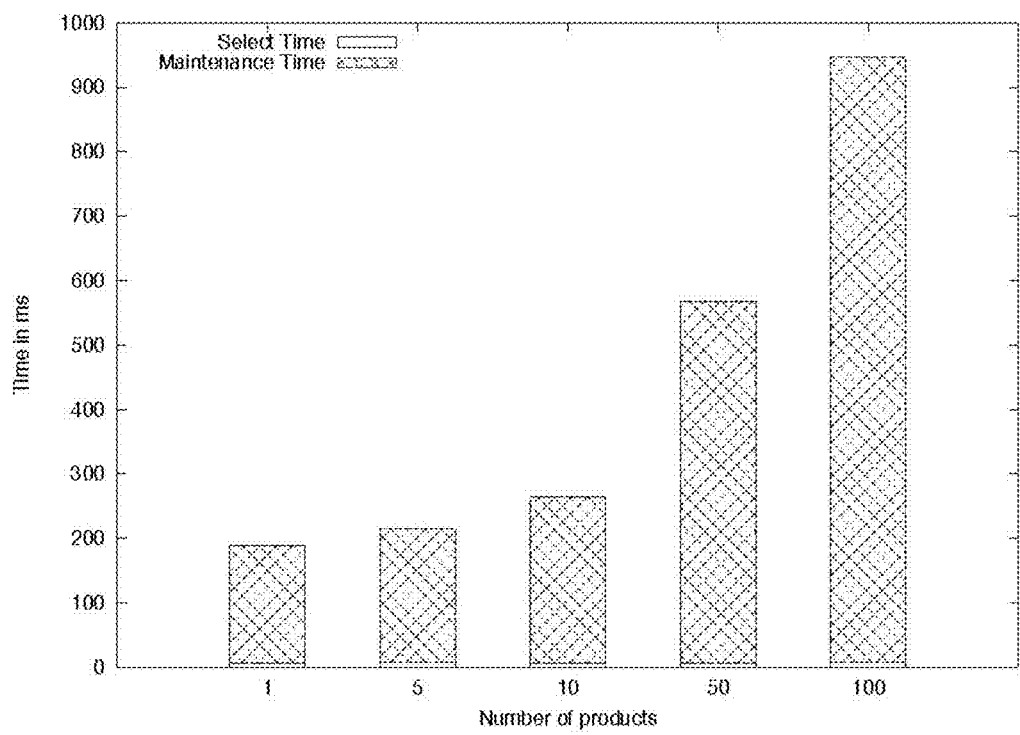
FIG. 14 shows the performance of the lazy incremental update strategy for a varying number of products. The workload consists of 1000 write operations to a base table of 10 million records and uniformly interleaved read operations to the materialized aggregate.

With the evolution of the lazy incremental update (LIU) several writes to the base table can be condensed to fewer effective updates of the materialized view table. In order to research the effectiveness of this condensation, the following benchmark was carried out: With a base table size of 10 million records, it was run a workload consisting of 1000 writes to the base table uniformly interleaved with 100 reads from the materialized aggregate. This benchmark simulates the workload of a single day. The varying parameter in this workload is the number of affected products. The benchmark ranges from runs with a single product affected during the write operation in the workload to runs with write operations scattered over 100 products. The results of this benchmark can be seen in FIG. 14. A delta structure in the proxy records the running delta introduced to the materialized aggregate by each write to the base table. Since the workload simulates exactly one day and the materialized aggregate are grouped by day and product, the number of products affected by the writes determines the number of rows in the delta structure. Furthermore, the number of rows in the delta structure determines the run time of the LIU maintenance operation. If there is only one product affected in the workload, all writes to this product between any two read operations can be condensed to a single effective delta. If there are 100 products affected in the workload, the delta structure has to maintain 100 effective deltas and can only condense write operations on a per product basis. This effect can be observed in FIG. 14: If more products are affected in the write operations of the workload, the overall maintenance time under LIU increases. This shows that LIU is a preferential strategy if workloads are condensable in terms of the read operations and the grouping the materialized aggregate creation statement.

(6) Cost Estimator vs. Benchmark

Figure 15:
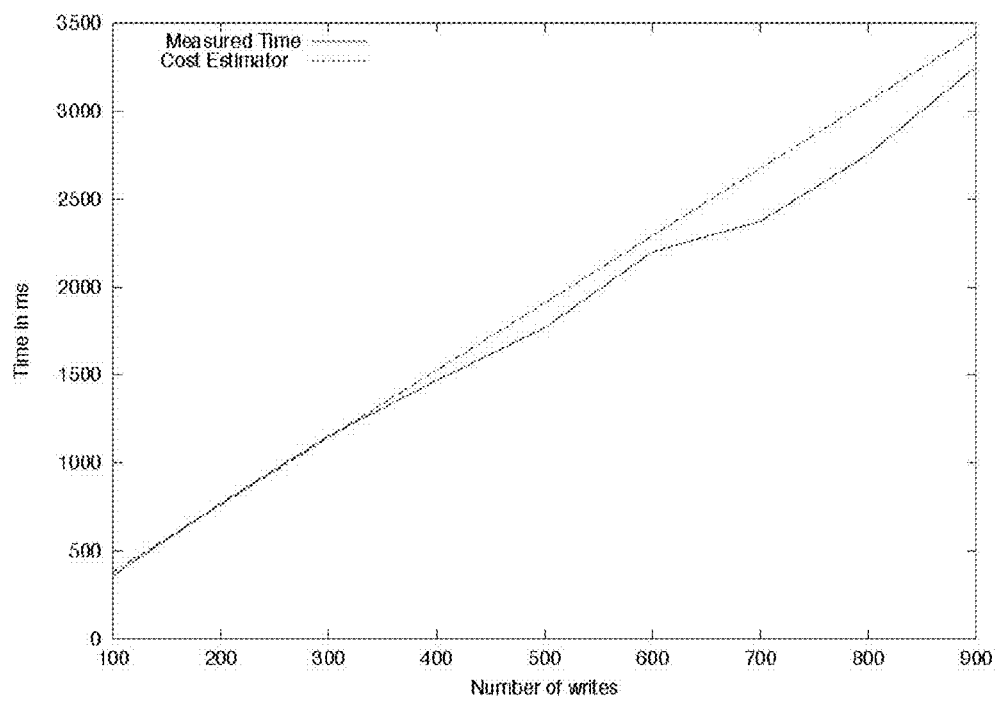
FIG. 15 shows a comparison of the measured run time and the calculated run time from the cost model for an eager incremental update strategy. The base table consisted of 100,000 rows and each workload had exactly 100 read operations on the materialized aggregate.

Section B.III introduced the notion of a cost model that captures the run time of a workload under a given maintenance strategy. In this section some benchmarks were introduced to measure the actual performance of different strategies. It is of interest whether the cost model correctly predicts the actual performance of strategies. Therefore, another benchmark was carried out in order to compare the calculated and measured run times of varying workloads. The base table had 100,000 rows and the workload 1010 consisted of exactly 100 reads to the materialized aggregate. The number of write operations to base table was varied starting at 100 writes up to 900 writes. FIG. 15 shows that the cost model 1006 closely resembles the run time of the actual implementation of the eager incremental update. Equation (iii) shows a linear relation between the number of writes and the total runtime. The measured time from the benchmark also shows a linear relationship. The cost model 1006 fits the observed data with a coefficient of determination $R2 \approx 0.96$.

(7) Eager vs. Lazy

Figure 16:
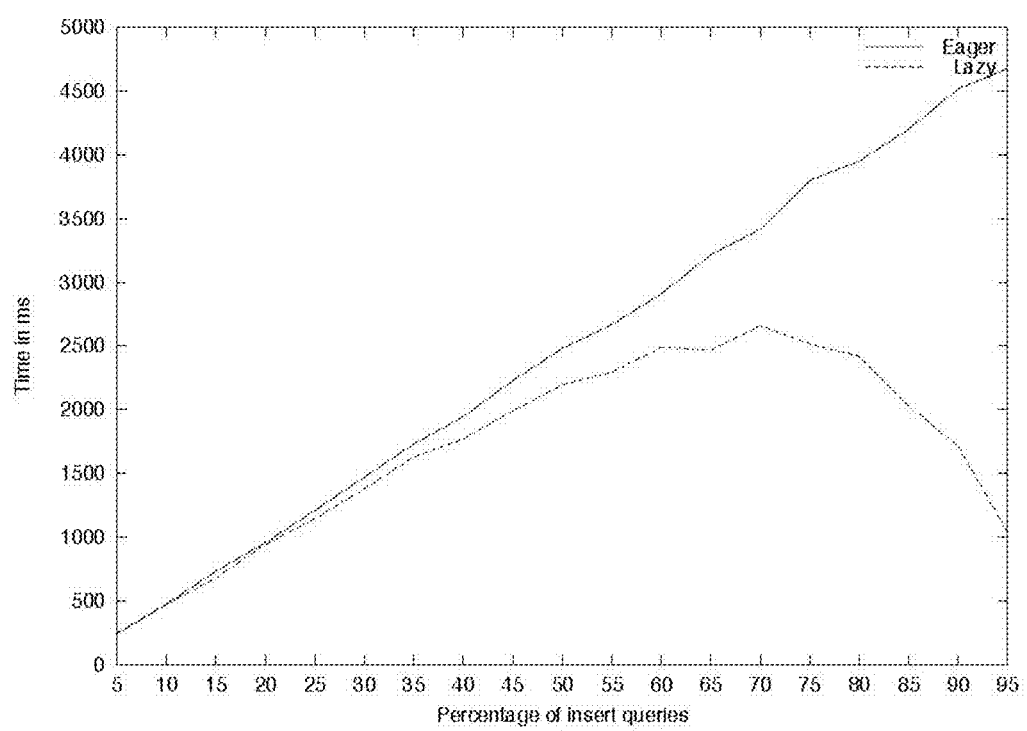
FIG. 16 shows a benchmark for the eager and lazy incremental update strategies using a fix total number of queries. The workload consisted of 1000 queries with a uniform distribution. The dataset had 1M records.

To demonstrate the performance impact of the select-insert ratio, a benchmark was run to measure the maintenance time for varying select-insert ratios (cf. FIG. 16). The number of statements was constant. There were two types of queries: single inserts and selects querying the aggregates filtered by a random single product. For eager incremental update, each insert triggers an aggregate maintenance operation. Hence, the maintenance time increases in a linear manner with a growing number of inserts. Lazy incremental update can summarize multiple inserts. The probability of such optimizations increases with the ratio of inserts. That is why lazy strategies will outperform eager ones if the workload consists of a high percentage of insert queries.

(8) Optimal Merge Timing

Figure 17:
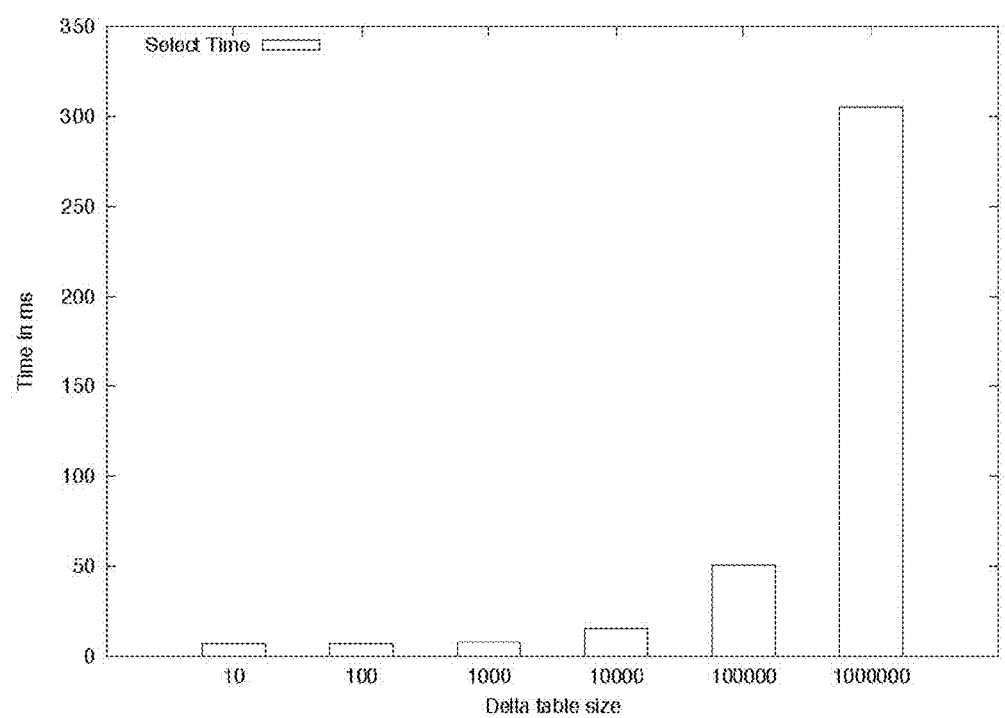
FIG. 17 shows the execution time of a single read operation for the merge update strategy for different delta table sizes.

The costs of the merge update strategy mainly depend on the aggregation performance on the delta table 114. As shown in FIG. 17, the execution time for a read operation including an on the fly aggregation increases with a growing delta table 114. An aggregation on a delta table 114 with fewer than 100 k records requires less than 100 ms. A delta table size above that decreases the performance significantly. Therefore, frequent merging helps to reduce the execution time of read operations. However, a merge operation also generates costs that have to be considered. To determine the optimal timing for a merge, both costs have to be considered. Comparing the merge update strategy with the other strategies, as long as the aggregation on the delta table 114 is faster than the maintenance costs of the other strategies, the merge update strategy is the best choice.

C.

Two Table Schema

Figure 18:
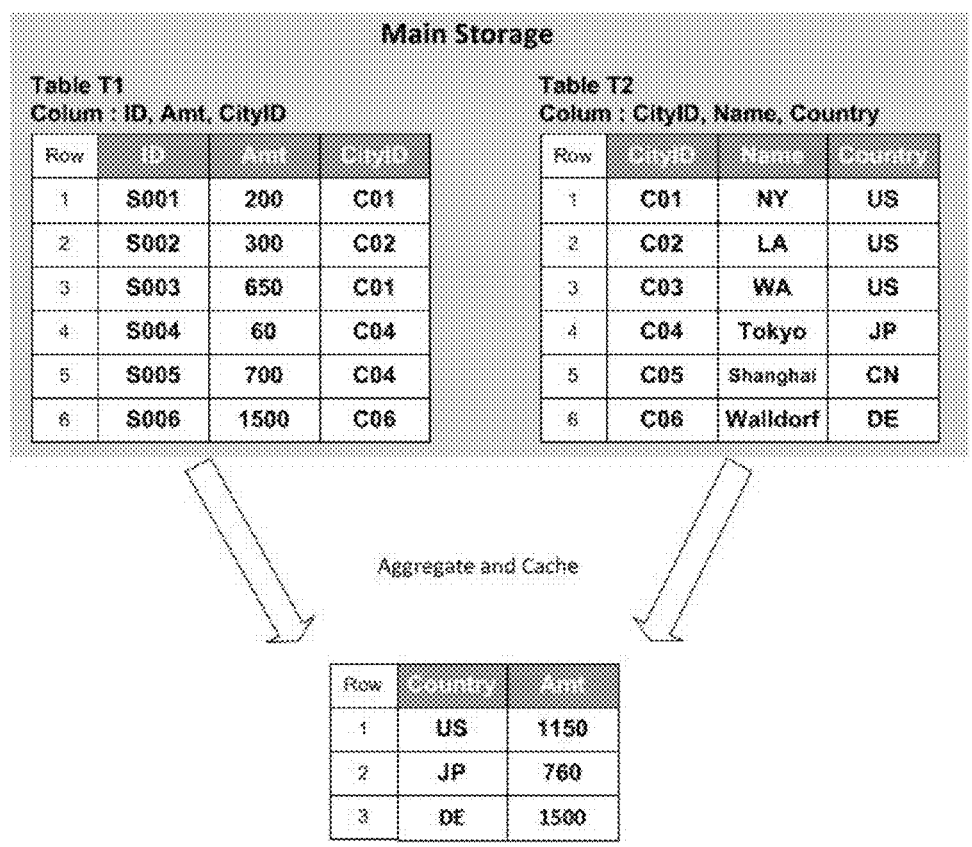
FIG. 18 shows two tables of a schema and the result of running a query against the join of these two tables.
Figure 19:
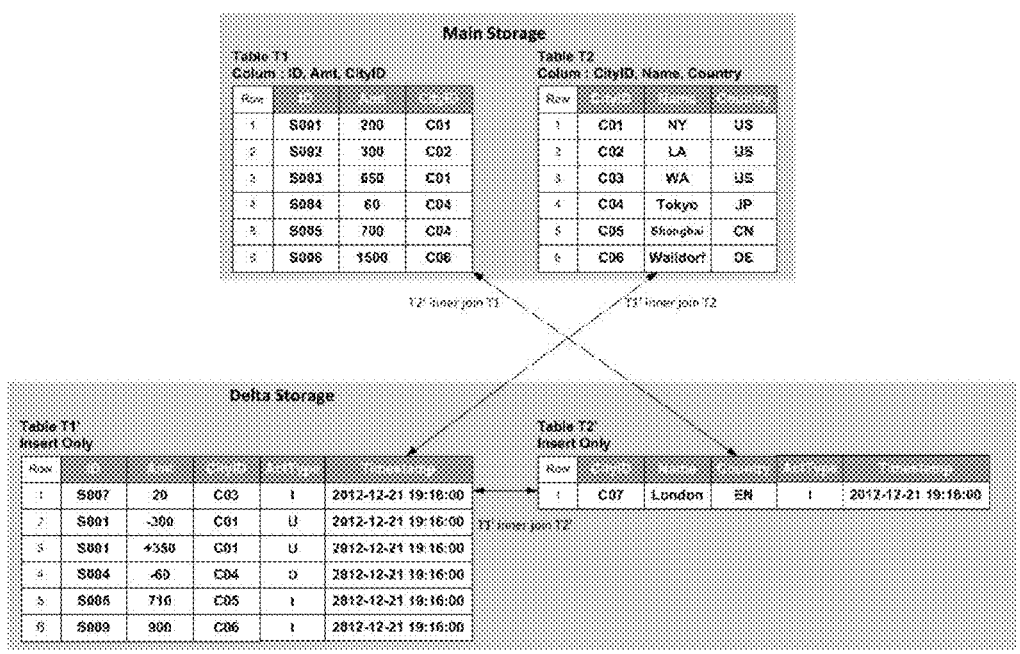
FIG. 19 shows the same database, where record changes have occurred in both tables of the schema so that each of the tables is partitioned into a main store (T1 and T2) and a differential buffer (T1' and T2').
Figure 20:
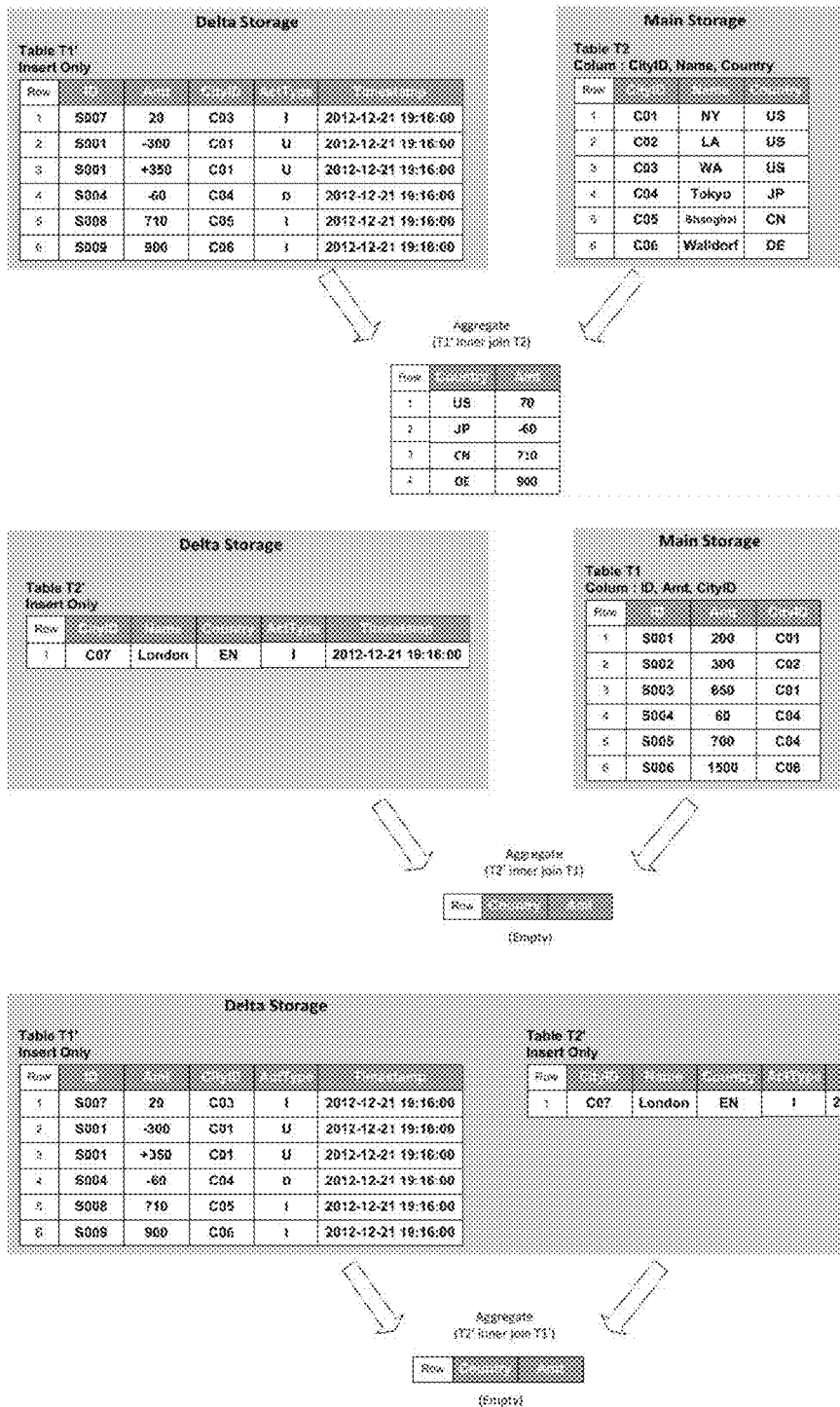
FIG. 20 shows details of these three joins carried out on the table partitions shown in FIG. 19.
Figure 21:
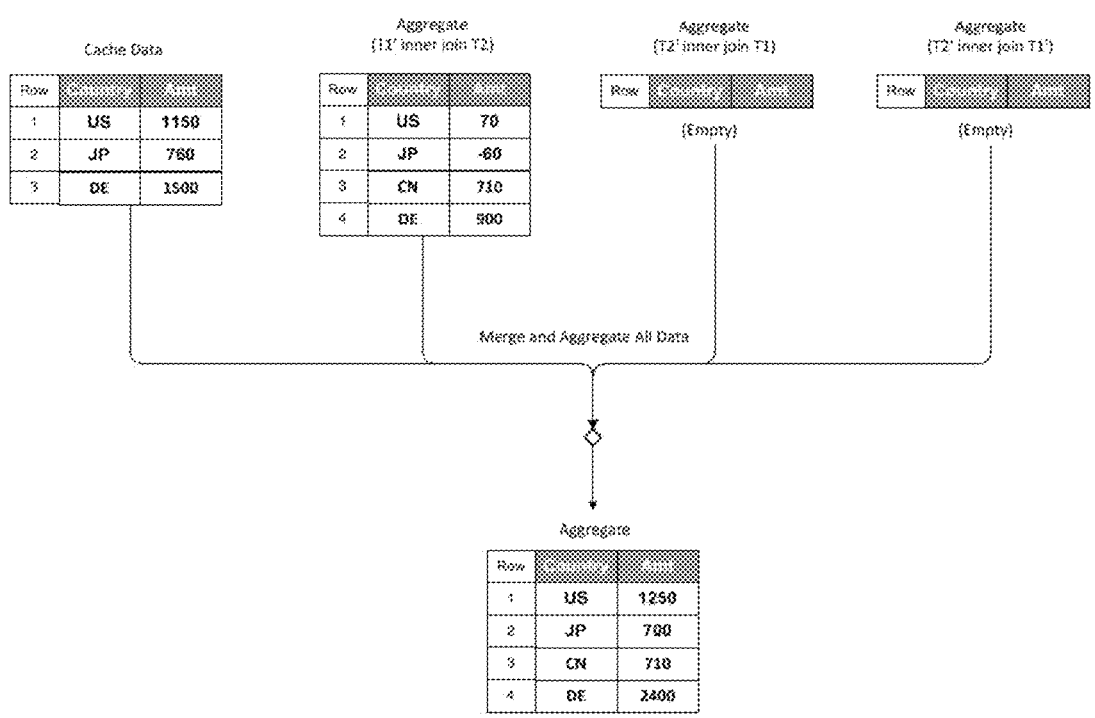
FIG. 21 shows the final result of combining the three joins of FIG. 20.

According to another advantageous embodiment, the schema against which the query to be cached consists if two tables. FIG. 18 shows the two tables of the schema. All the records are stored in the main store. Further, FIG. 18 shows the result of the query "SELECT T2.County, SUM (T1.Amt) from T1 inner join T2 on T1.CityID=T2.CityID GROUP BY T2.County". When the schema is a multiple-table schema, this sort of query against the join of all table partitions stored in the main store is also falls under scope of the expression "query against those records of the schema that are stored in the main store". FIG. 19 shows the same database, where record changes have occurred in both tables of the schema so that each of the tables is partitioned into a main store (T1 and T2) and a differential buffer (T1' and T2'). When the result shown in FIG. 18 is cached in the cache store, an up-to-date result can be determined by calculating three joins, namely the joins of T2' with T1, T1' with T2, T1' with T2', and running the aggregate function against each of the results. This is because, although record changes in one table only exist in the differential buffer, these changes may also reflect with other tables. Details of these three joins can be seen in FIG. 20. After these three join and aggregation calculations, the cache controller only needs to union these results and the cached result to obtain the final result. This is shown in FIG. 21.

D.

Further Benchmark Results

Figure 22:
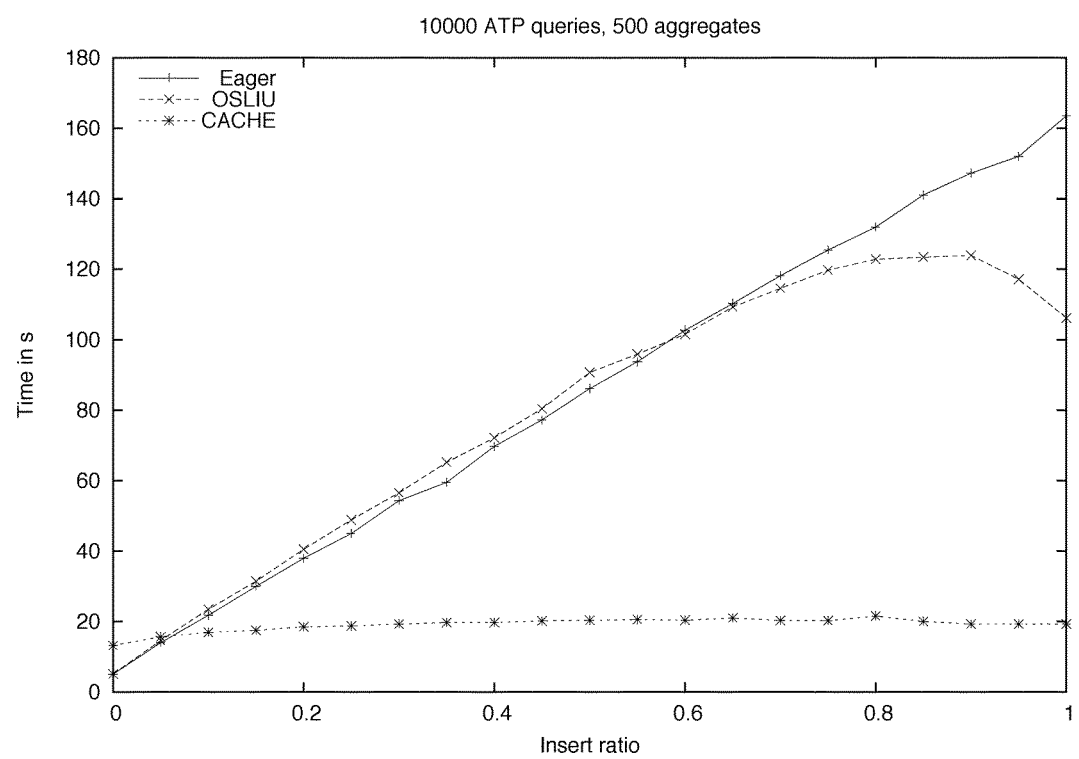
FIG. 22-25 show benchmark results relating to the implicit invalidation strategy.
Figure 23:
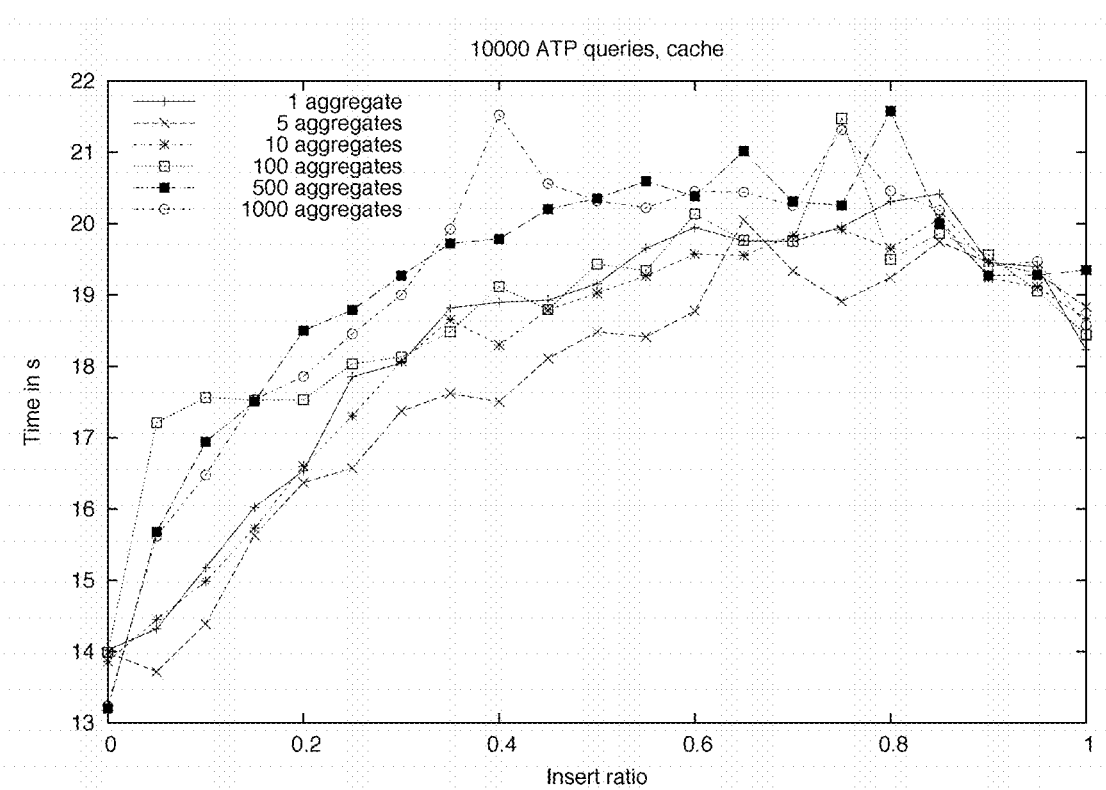
Figure 24:
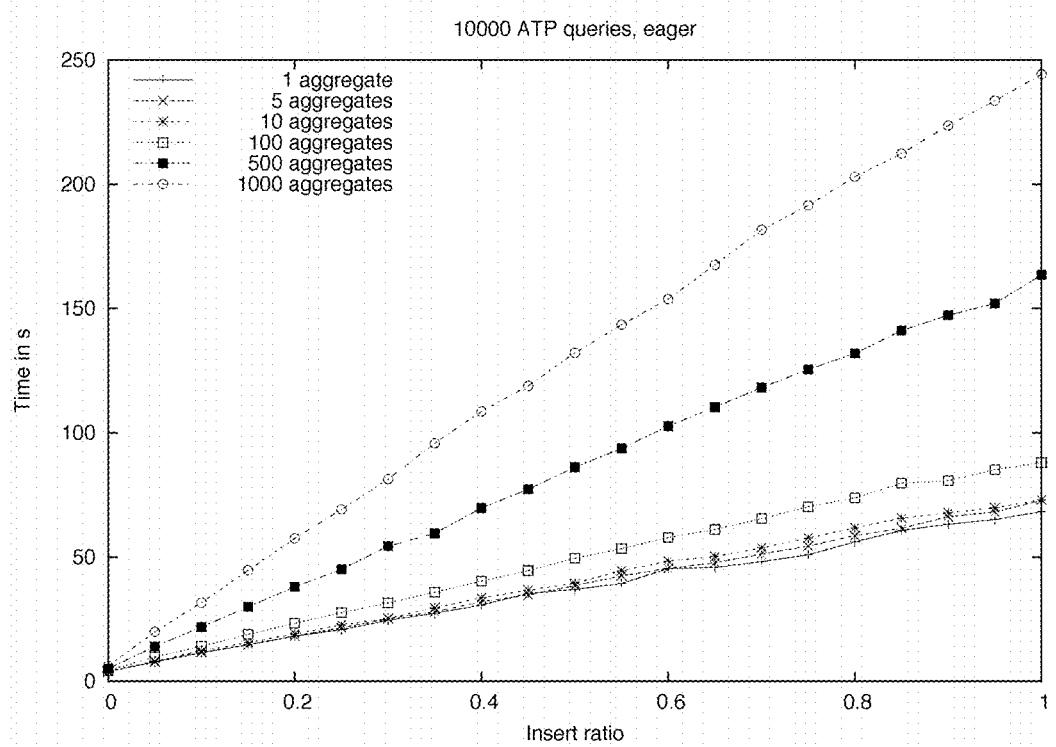
Figure 25:
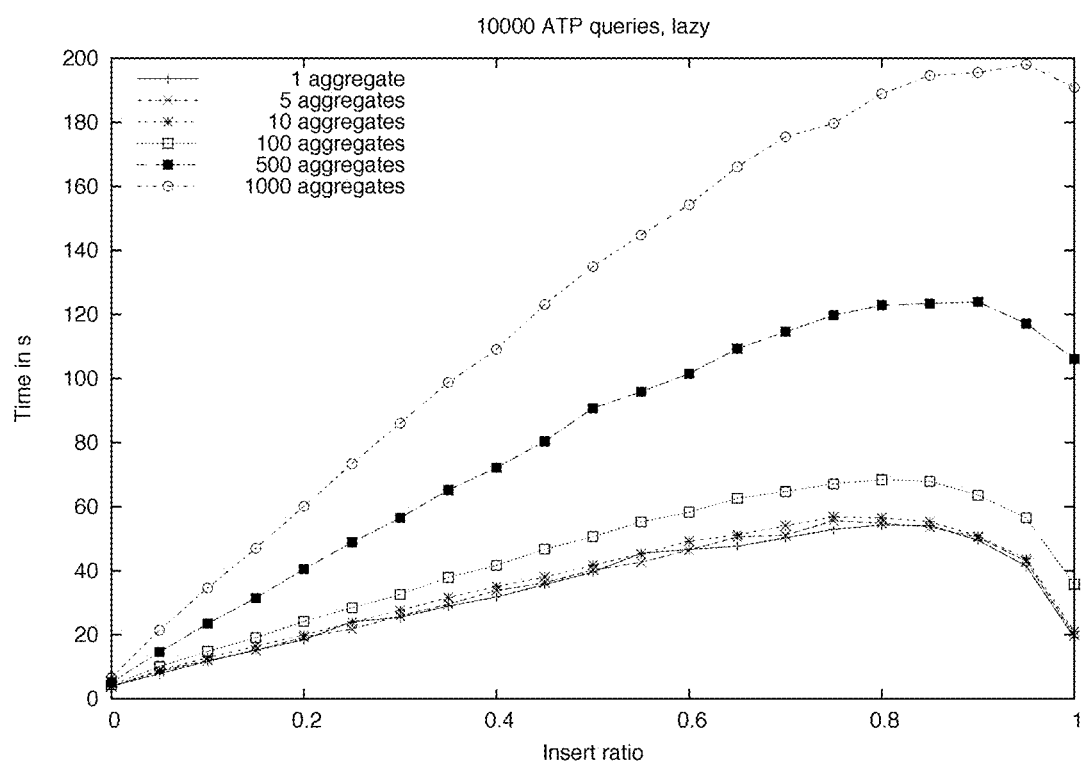

Further benchmark results are shown in FIGS. 22 to 25. These results are obtained from a system according to the invention that is running an available-to-promise (=ATP) application. The focus of these benchmarks lies on the influence of large numbers of cached aggregate queries (herein simply referred to as "aggregates"). FIG. 22 shows the time required for 10000 ATP queries when there are 500 cached aggregate queries as a function of the insert ratio (number of inserts per number of inserts and selects combined) for three different update strategies, namely an eager update strategy (=EAGER), a smart lazy incremental update strategy (=OSLIU=LAZY), and the merge update strategy (=CACHE). The merge update strategy is such that no invalidation is performed when a new record is inserted. Instead, the query result is always calculated from the cached result and those records that have been modified since the cached result has been stored in the cache store. This is also referred to as implicit invalidation strategy (see A.II.5). FIG. 23 shows the time required for a query the time required for 10000 ATP queries when there are varying number of cached aggregate queries (1, 5, 10, 100, 500, and 1000 cached aggregate queries) as a function of the insert ratio (number of inserts per number of inserts and selects combined) for the abovementioned merge update strategy without invalidation upon record insertion (=CACHE). FIG. 24 shows the time required for a query the time required for 10000 ATP queries when there are varying number of cached aggregate queries (1, 5, 10, 100, 500, and 1000 cached aggregate queries) as a function of the insert ratio (number of inserts per number of inserts and selects combined) for an eager update strategy (=EAGER). FIG. 25 shows the time required for a query the time required for 10000 ATP queries when there are varying number of cached aggregate queries (1, 5, 10, 100, 500, and 1000 cached aggregate queries) as a function of the insert ratio (number of inserts per number of inserts and selects combined) for a smart lazy incremental update strategy (=OSLIU=LAZY). From these benchmark results, it can be seen that the merge update strategy without invalidation upon record insertion (=CACHE) shows almost constant performance even when the number of cached aggregate queries and/or the insert ratio increases.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

The invention claimed is:

1. A computer system for both online transaction processing and online analytical processing, comprising:
a processor;
a database coupled to the processor, the database comprising:
    a main store for storing records,
    a differential buffer for receiving and buffering added or deleted or modified records, the differential buffer being coupled to the main store,
    a schema comprising records stored in the main store and records stored in the differential buffer, and
    a cache store for caching a result of a query against the schema, wherein the query involves calculating an aggregate function; and
a cache controller executable by the processor and communicatively coupled to the database, the cache controller being configured for:
storing a result of the query in the cache store as a materialized aggregate;
receiving an analytical request; and
determining, in response to the received request, an up-to-date materialized aggregate by:
    accessing the cache store to obtain the cached materialized aggregate;
    determining the records of the schema that have been added or deleted or modified since the step of storing the cached result in the cache store on the basis of the records stored in the differential buffer; and
    incrementally deriving the up-to-date materialized aggregate from the cached materialized aggregate and from the records determined in the previous step,
wherein the cache controller is further configured for updating the cached materialized aggregate according to a merge update strategy, the merge update strategy comprising:
    replacing the cached materialized aggregate in the cache store in response to the computer system initiating a merge of the records of the differential buffer into the main store, by:
        accessing the cached query from the cache store during the merge;
        determining the records of the schema that have been added or deleted or modified since the step of storing the cached result in the cache store on the basis of the records stored in the differential buffer;
        incrementally deriving the up-to-date materialized aggregate from the cached materialized aggregate and from the records determined in the previous step; and
        replacing the cached materialized aggregate in the cache store with the up-to-date materialized aggregate.

2. The computer system according to claim 1,
wherein the database further comprises a cache management store for storing an existence indicator indicating whether the cached result exists or not; and
wherein the cache controller is configured for:
determining, in response to the received request, an up-to-date result of the query by: checking the existence indicator as to whether there is a cached result of the query in the cache store, and
if there is a cached result of the query in the cache store, accessing the cache store to obtain the cached result as the up-to-date result of the query; or if there is no cached result of the query in the cache store, taking alternative action comprising running the query against the entire schema in order to obtain the up-to-date result.

3. The computer system according to claim 1, wherein the step of incrementally deriving includes:
running the query against those records of the schema that have been added or deleted or modified between the step of storing the cached result in the cache store and the step of receiving the request; and
combining the results of the latter query with the accessed cached result in order to obtain the up-to-date result.

4. The computer system according to claim 1,
wherein the database further comprises: a cache management store for storing a validation indicator indicating whether the cached result is still valid or not; and
wherein the cache controller is configured for:
determining, in response to the received request, an up-to-date result of the query by: checking the validation indicator of the cache management store as to whether the cached result is still valid;
if the cached result is still valid, accessing the cache store to obtain the cached result as the up-to-date result; or
if the cached result is not valid, taking alternative action comprising:
accessing the cache store to obtain the cached result;
determining the records of the schema that have been added or deleted or modified since the step of storing the cached result in the cache store on the basis of the records stored in the differential buffer; and
incrementally deriving the up-to-date result from the cached result and from the records determined in the previous step.

5. The computer system according to claim 1,
wherein the database further comprises: a cache management store for storing an existence indicator indicating whether the cached result exists or not and a validation indicator indicating whether the cached result is still valid or not; and
wherein the cache controller is configured for:
determining, in response to the received request, an up-to-date result of the query by: checking the existence indicator of the cache management store as to whether there is a cached result of the query in the cache store, and
if there is a cached result of the query in the cache store, checking the validation indicator of the cache management store as to whether the cached result is still valid;
if the cached result is still valid, accessing the cache store to obtain the cached result as the up-to-date result of the query; or
if the cached result is not valid, taking alternative action comprising:
accessing the cache store to obtain the cached result;
determining the records of the schema that have been added or deleted or modified since the step of storing the cached result in the cache store on the basis of the records stored in the differential buffer; and
incrementally deriving the up-to-date result from the cached result and from the records determined in the previous step; and
if there is no cached result of the query in the cache store, taking alternative action comprising running the query against the entire schema in order to obtain the up-to-date result.

6. The computer system according to claim 1, wherein the cache controller is further configured for:
selecting one of a plurality of maintenance strategies, wherein the plurality of maintenance strategies includes no materialization, eager full update, eager incremental update, lazy update, smart lazy update, and merge update, wherein the selection is carried out by a cost estimator;
updating the cached result according to the selected maintenance strategy.

7. The computer system according to claim 4, wherein the cache controller is further configured for:
validating the materialized query cached in the cache store in response to an insertion of new records into the differential buffer, by:
determining the records of the schema that have been added or deleted or modified since the step of storing the cached result in the cache store on the basis of the records stored in the differential buffer;
running the query against the records determined in the latter step to obtain a validation result;
checking whether the validation result is empty or not; and
setting the validation indicator of the cache management store to invalid if the validation result is not empty.

8. The computer system according to claim 1, wherein the cache management store contains a cache indicator indicating whether the result of the query is to be cached, wherein the cache controller is configured for:
checking the cache indicator of the cache management store as to whether the result of the query is to be cached or not;
if the result is not to be cached, running the query against the entire schema in order to obtain the up-to-date result; and
if the result is to be cached, taking alternative action comprising determining an up-to-date result.

9. The computer system according to claim 8, wherein the cache controller is further configured for:
generating access statistics regarding the cached results, and storing them in the cache management store; and
setting the cache indictor of the cache management store to caching or no caching in dependence of generated access statistics.

10. The computer system according to claim 1, wherein the database further comprise a current record validity store and a cached record validity store for storing the record validity store at the time of creating or updating the cached result, and wherein the cache controller is further configured for: comparing the cached record validity store with the current record validity store to determine all records in the main store that have been invalidated; and taking these invalidated records into account when determining an up-to-date result of the query or when replacing the cached result of the query.

11. The computer system according to claim 1, wherein the cache controller comprises a garbage collection mechanism for eliminating cached queries that are not worthwhile to store in the cache store.

12. A method implemented in a computer system for both online transaction processing and online analytical processing, comprising the steps of:
providing the computer system that comprises:
a processor;
a database coupled to the processor, the database comprising:

a main store for storing records,
a differential buffer for receiving and buffering records, the differential buffer being coupled to the main store,
a schema comprising records stored in the main store and records stored in the differential buffer, and
a cache store for caching a result of a query against the schema, wherein the query involves calculating an aggregate function; and
a cache controller executable by the processor and communicatively coupled to the database; and
the cache controller performing the following steps:
storing a result of the query in the cache store as a materialized aggregate;
receiving an analytical request; and
determining, in response to the received request, an up-to-date materialized aggregate by:
accessing the cache store to obtain the cached materialized aggregate;
determining the records of the schema that have been added or deleted or modified since the step of storing the cached result in the cache store on the basis of the records stored in the differential buffer; and
incrementally deriving the up-to-date materialized aggregate from the cached materialized aggregate and from the records determined in the previous step,
wherein the cache controller is further configured for updating the cached materialized aggregate according to a merge update strategy, the merge update strategy comprising:
replacing the cached materialized aggregate in the cache store in response to the computer system initiating a merge of the records of the differential buffer into the main store, by:
accessing the cached query from the cache store during the merge;
determining the records of the schema that have been added or deleted or modified since the step of storing the cached result in the cache store on the basis of the records stored in the differential buffer;
incrementally deriving the up-to-date materialized aggregate from the cached materialized aggregate and from the records determined in the previous step; and
replacing the cached materialized aggregate in the cache store with the up-to-date materialized aggregate.

13. A non-transitory computer-readable medium comprising a plurality of machine-readable instructions that are executed by a computer system having one or more processors, the computer system including a processor, a database, and a cache controller, the database comprising a main store for storing records, a differential buffer for receiving and buffering records, a schema comprising records stored in the main store and records stored in the differential buffer, and a cache store for caching a result of a query against the schema, wherein the query involves calculating an aggregate function, and wherein the machine-readable instructions control the cache controller to perform the following steps:
storing a result of the query in the cache store as a materialized aggregate;
receiving an analytical request; and
determining, in response to the received request, an up-to-date materialized aggregate by:
accessing the cache store to obtain the cached materialized aggregate;
determining the records of the schema that have been added or deleted or modified since the step of storing the cached result in the cache store on the basis of the records stored in the differential buffer; and
incrementally deriving the up-to-date materialized aggregate from the cached materialized aggregate and from the records determined in the previous step,
wherein the cache controller is further configured for updating the cached materialized aggregate according to a merge update strategy, the merge update strategy comprising:
replacing the cached materialized aggregate in the cache store in response to the computer system initiating a merge of the records of the differential buffer into the main store, by:
accessing the cached query from the cache store during the merge;
determining the records of the schema that have been added or deleted or modified since the step of storing the cached result in the cache store on the basis of the records stored in the differential buffer;
incrementally deriving the up-to-date materialized aggregate from the cached materialized aggregate and from the records determined in the previous step; and
replacing the cached materialized aggregate in the cache store with the up-to-date materialized aggregate.

* * * * *